(12) United States Patent
Han et al.

(10) Patent No.: US 11,984,985 B2
(45) Date of Patent: May 14, 2024

(54) METHOD OF PERFORMING WIRELESS COMMUNICATION, WIRELESS TRANSMISSION DEVICE AND WIRELESS RECEPTION DEVICE PERFORMING THE SAME

(71) Applicant: Samsung Electronics Co., Ltd., Suwon-si (KR)

(72) Inventors: Jonghun Han, Gwacheon-si (KR); Chulho Chung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 99 days.

(21) Appl. No.: 17/346,705

(22) Filed: Jun. 14, 2021

(65) Prior Publication Data

US 2022/0060284 A1 Feb. 24, 2022

(30) Foreign Application Priority Data

Aug. 19, 2020 (KR) .................. 10-2020-0104005
Apr. 5, 2021 (KR) .................. 10-2021-0043909

(51) Int. Cl.
*H04L 1/16* (2023.01)
*H04L 1/1607* (2023.01)
*H04W 8/24* (2009.01)
*H04W 80/02* (2009.01)

(52) U.S. Cl.
CPC .......... *H04L 1/1642* (2013.01); *H04L 1/1614* (2013.01); *H04L 1/1621* (2013.01); *H04W 8/24* (2013.01); *H04W 80/02* (2013.01)

(58) Field of Classification Search
CPC ......... H04W 8/24; H04W 80/02; H04W 8/22; H04L 1/1642; H04L 1/1614; H04L 1/1621
See application file for complete search history.

(56) References Cited

U.S. PATENT DOCUMENTS

| | | | |
|---|---|---|---|
| 6,744,766 B2 | 6/2004 | Alapuranen | |
| 7,158,899 B2 | 1/2007 | Sunter et al. | |
| 7,453,255 B2 | 11/2008 | Sunter et al. | |

(Continued)

FOREIGN PATENT DOCUMENTS

| | | |
|---|---|---|
| JP | 2015529047 A | 10/2015 |
| KR | 100734388 B1 | 7/2007 |
| KR | 100930136 B1 | 12/2009 |

*Primary Examiner* — Congvan Tran
(74) *Attorney, Agent, or Firm* — Harness, Dickey & Pierce, P.L.C.

(57) ABSTRACT

A method of performing wireless communication including generating, by a wireless transmission device, an Aggregate-Medium Access Control (MAC) Protocol Data Unit (A-MPDU) including a plurality of MPDUs and a plurality of sequence numbers corresponding to the plurality of MPDUs, transmitting, by the wireless transmission device, the A-MPDU to a wireless reception device, generating, by the wireless reception device, burst information based on one or more success sequence numbers among the plurality of sequence numbers, the one or more success sequence numbers corresponding to one or more MPDUs successfully received by the wireless reception device among the plurality of MPDUs, and transmitting, by the wireless reception device, a block acknowledgement (BA) frame based on the burst information to the wireless transmission device.

20 Claims, 16 Drawing Sheets

(56) References Cited

U.S. PATENT DOCUMENTS

| | | |
|---|---|---|
| 8,102,829 B2 | 1/2012 | Naito et al. |
| 8,233,462 B2 | 7/2012 | Walton et al. |
| 8,284,752 B2 | 10/2012 | Ketchum et al. |
| 8,315,271 B2 | 11/2012 | Nanda et al. |
| 8,472,473 B2 | 6/2013 | Ketchum et al. |
| 8,483,105 B2 | 7/2013 | Nanda et al. |
| 8,582,430 B2 | 11/2013 | Ketchum et al. |
| 8,774,098 B2 | 7/2014 | Ketchum et al. |
| 8,832,515 B2 | 9/2014 | Asterjadhi et al. |
| 8,842,657 B2 | 9/2014 | Walton et al. |
| 9,019,822 B2 | 4/2015 | Asterjadhi et al. |
| 9,137,087 B2 | 9/2015 | Nanda et al. |
| 9,226,308 B2 | 12/2015 | Ketchum et al. |
| 9,253,290 B2 | 2/2016 | Asterjadhi et al. |
| 9,301,196 B2 | 3/2016 | Asterjadhi et al. |
| 9,363,707 B2 | 6/2016 | Merlin et al. |
| 9,432,879 B2 | 8/2016 | Asterjadhi et al. |
| 9,860,174 B2 | 1/2018 | Merlin et al. |
| 10,708,958 B2 * | 7/2020 | Ryu .................... H04W 74/085 |
| 2008/0008186 A1 | 1/2008 | Fan et al. |
| 2010/0241919 A1 | 9/2010 | Jeon |
| 2010/0329197 A1 * | 12/2010 | Boariu ................. H04W 72/21 |
| | | 370/329 |
| 2013/0070715 A1 | 3/2013 | Nanda et al. |
| 2013/0223211 A1 | 8/2013 | Asterjadhi et al. |
| 2013/0223338 A1 | 8/2013 | Asterjadhi et al. |
| 2013/0230038 A1 | 9/2013 | Walton et al. |
| 2015/0146648 A1 * | 5/2015 | Viger .................... H04L 1/1685 |
| | | 370/329 |
| 2015/0146654 A1 * | 5/2015 | Chu ..................... H04L 1/1887 |
| | | 370/329 |
| 2018/0213433 A1 * | 7/2018 | Sugaya ................ H04W 28/10 |
| 2019/0007971 A1 * | 1/2019 | Yoshimura ........... H04W 28/06 |
| 2019/0173625 A1 * | 6/2019 | Ghosh .................. H04L 1/1854 |
| 2020/0280399 A1 * | 9/2020 | Kim ..................... H04L 1/1864 |

* cited by examiner

FIG. 6

| CASE | TXD_AGB | RXD_BFS | MAX_AG_NUM |
|------|---------|---------|------------|
| 1 | 64 | 64 | 64 |
| 2 | 64 | 256 | 64 |
| 3 | 256 | 64 | 64 |
| 4 | 256 | 256 | 256 |

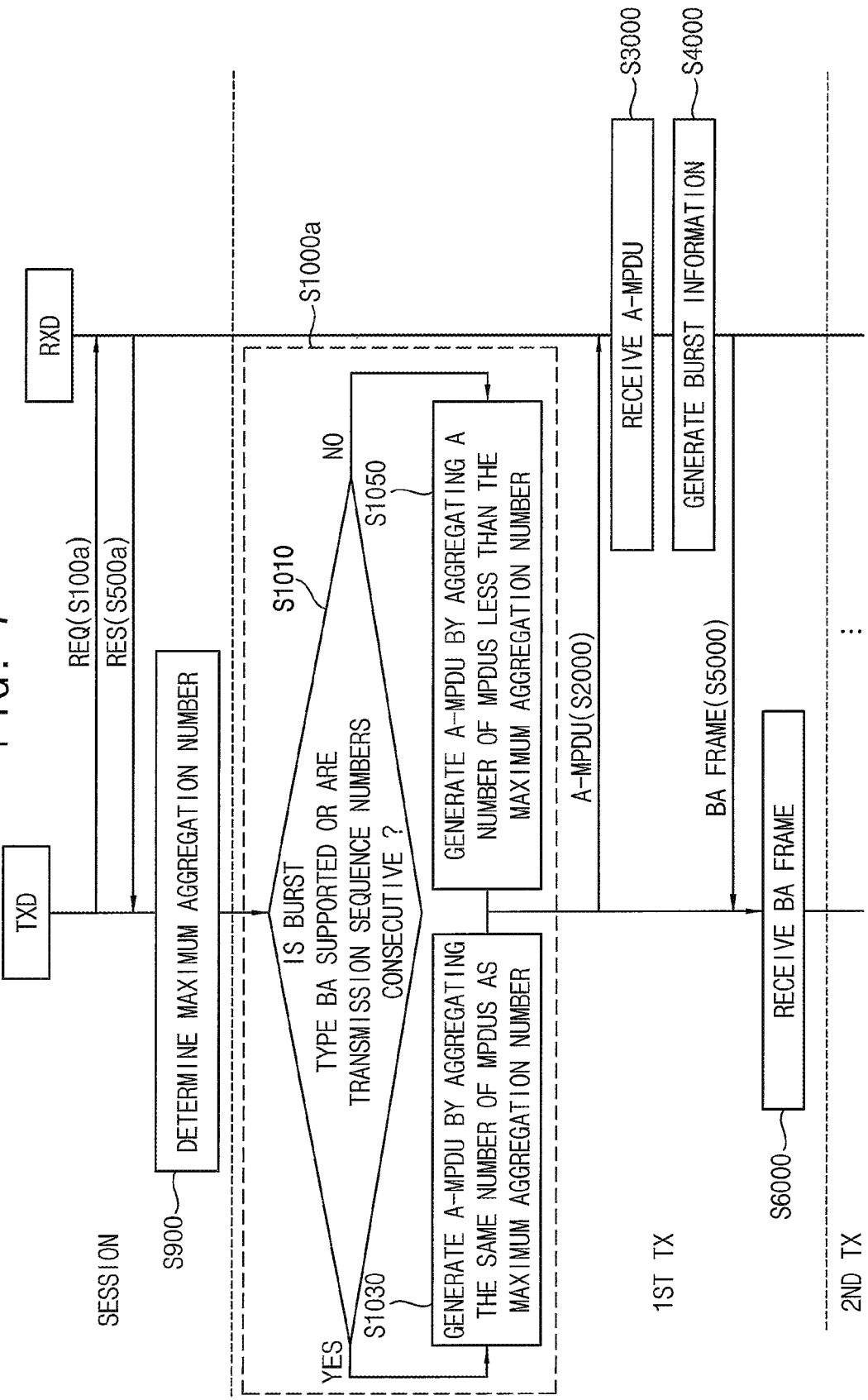

METHOD OF PERFORMING WIRELESS COMMUNICATION, WIRELESS TRANSMISSION DEVICE AND WIRELESS RECEPTION DEVICE PERFORMING THE SAME

CROSS-REFERENCE TO RELATED APPLICATION

This U.S. non-provisional application claims priority under 35 USC § 119 to Korean Patent Application No. 10-2020-0104005, filed on Aug. 19, 2020 and Korean Patent Application No. 10-2021-0043909, filed on Apr. 5, 2021, in the Korean Intellectual Property Office (KIPO), the disclosures of which are incorporated by reference herein in their entirety.

BACKGROUND

1. Technical Field

Example embodiments relate generally to wireless communication, and more particularly to a method of performing a wireless communication, a wireless transmission device and a wireless reception device performing the method.

2. Discussion of the Related Art

As a wireless communication technology widely used in modern times, Wireless Fidelity (WiFi) technology has been continuously developed since the Institute of Electrical and Electronic Engineers (IEEE) 802.11 standard was first proposed in 1997. Particularly, the IEEE 802.11n standard enables a wireless transmission device to aggregate a plurality of Media Access Control (MAC) Protocol Data Units (MPDUs) in an Aggregate-MAC Protocol Data Unit (A-MPDU) and transmit the A-MPDU to a wireless reception device. The IEEE 802.11n standard also enables the wireless reception device to perform a block acknowledgement (BA) on all of a plurality of MPDUs aggregated in a received A-MPDU. However, in a process of transmitting the A-MPDU, the wireless transmission device may not maximally aggregate, or aggregate a highest number of, the plurality of MPDUs in the A-MPDU, and in a process of performing the BA, excessive overhead may be caused in the wireless reception device.

SUMMARY

Example embodiments may provide a method of performing a wireless communication, a wireless transmission device and a wireless reception device, capable of improving transmission throughput and reducing overhead.

According to example embodiments, in a method of performing wireless communication is provided. The method includes generating, by a wireless transmission device, an Aggregate-Medium Access Control (MAC) Protocol Data Unit (A-MPDU) including a plurality of MPDUs and a plurality of sequence numbers corresponding to the plurality of MPDUs, transmitting, by the wireless transmission device, the A-MPDU to a wireless reception device, generating, by the wireless reception device, burst information based on one or more success sequence numbers among the plurality of sequence numbers, the one or more success sequence numbers corresponding to one or more MPDUs successfully received by the wireless reception device among the plurality of MPDUs, and transmitting, by the wireless reception device, a block acknowledgement (BA) frame based on the burst information to the wireless transmission device.

According to example embodiments, a wireless transmission device is provided. The wireless transmission device includes processing circuitry configured to determine a maximum aggregation number based on an aggregation capability of the wireless transmission device and a size of a reception buffer of a wireless reception device, generate an Aggregate-Medium Access Control (MAC) Protocol Data Unit (A-MPDU) including a plurality of MPDUs and a plurality of sequence numbers corresponding to the plurality of MPDUs by aggregating the plurality of MPDUs including the maximum aggregation number of MPDUs, and a transceiver configured to transmit the A-MPDU to the wireless reception device.

According to example embodiments, a wireless reception device is provided. The wireless reception device includes a transceiver configured to receive an Aggregate-Medium Access Control (MAC) Protocol Data Unit (A-MPDU) including a plurality of MPDUs and a plurality of sequence numbers corresponding to the plurality of MPDUs, and processing circuitry configured to generate burst information based on one or more success sequence numbers among the plurality of sequence numbers, the one or more success sequence numbers corresponding to one or more MPDUs successfully received by the transceiver among the plurality of MPDUs, generate burst type BA data based on the burst information, and generate a burst type BA frame including the burst type BA data.

In the method of performing wireless communication, and the wireless transmission device and the wireless reception device according to example embodiments, when the wireless reception device supports the burst type block acknowledgement (BA), the wireless transmission device may improve transmission throughput by aggregating a maximum or highest aggregation number of MPDUs in an A-MPDU and transmitting the A-MPDU to the wireless reception device. In addition, the wireless reception device may reduce overhead that may occur when performing the BA by performing the burst type BA or by adaptively performing one of the burst type BA and the bitmap type BA.

BRIEF DESCRIPTION OF THE DRAWINGS

Example embodiments of the present disclosure will be more clearly understood from the following detailed description taken in conjunction with the accompanying drawings.

FIG. 6 is a diagram for describing a process of determining a maximum or highest aggregation number.

FIG. 7 is a flowchart illustrating a method of performing wireless communication according to example embodiments.

DETAILED DESCRIPTION

Figure 1:
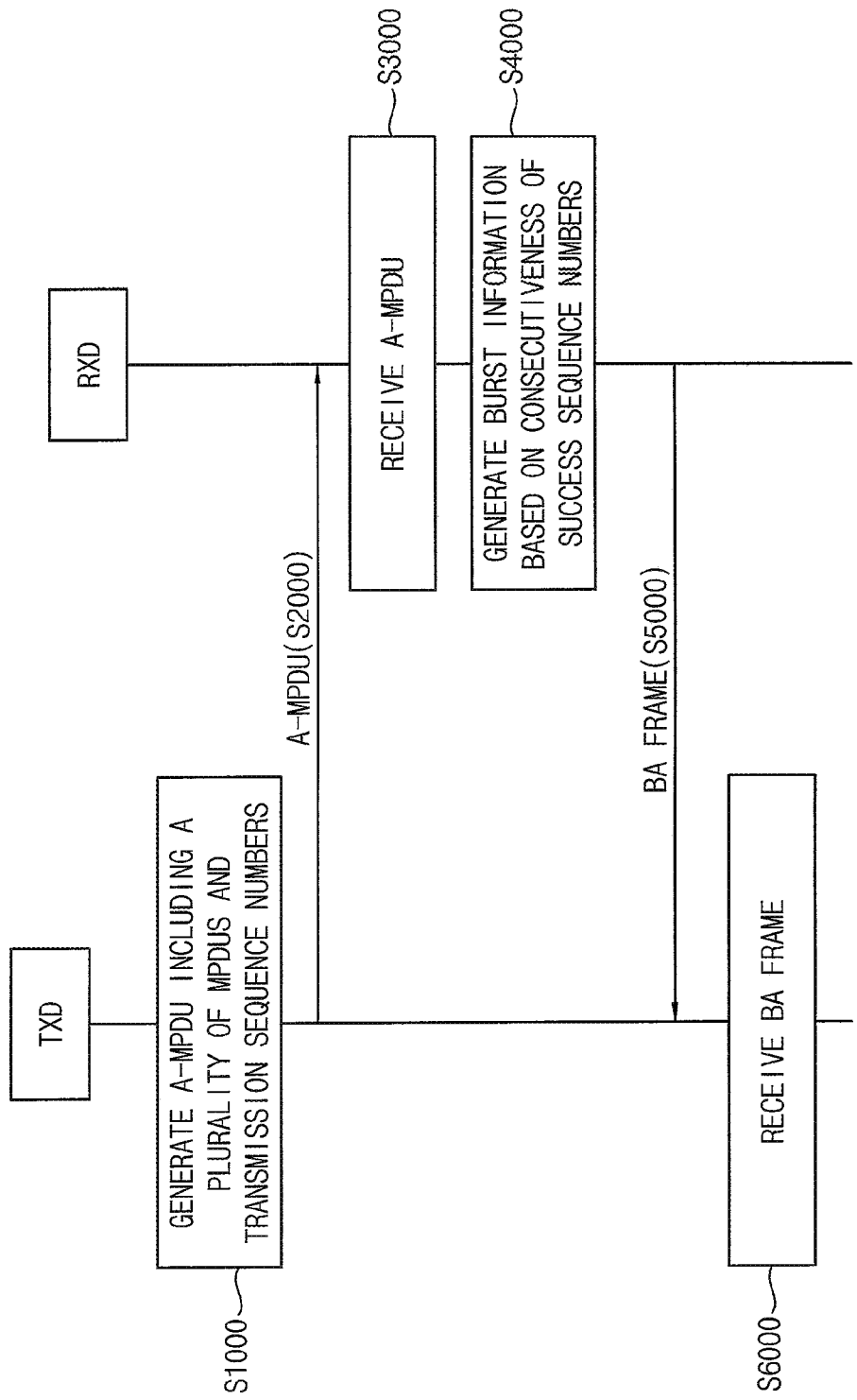
FIG. 1 is a flowchart illustrating a method of performing wireless communication according to example embodiments.

Example embodiments will be described more fully hereinafter with reference to the accompanying drawings, in which example embodiments are shown. In the drawings, like numerals refer to like elements throughout. The repeated descriptions may be omitted.

In this disclosure, it is assumed that wireless communication is performed between a wireless transmission device TXD and a wireless reception device RXD conforming to the Institute of Electrical and Electronic Engineers (IEEE) 802.11n or later standard. The IEEE 802.11n standard defines a Media Access Controller (MAC) (may also be referred to as a Media Access Control (MAC)) sub-layer, and physical layers and the like, for performing wireless communication using a wireless local area network (WLAN) in frequency bands such as 2.4 GHz and 5 GHz.

The wireless transmission device TXD and the wireless reception device RXD may configure a basic service set (BSS). The wireless transmission device TXD may be an access point (AP), and the wireless reception device RXD may be a station STA. The wireless transmission device TXD may be referred to as an 'originator', and the wireless reception device RXD may be referred to as a 'recipient', respectively.

FIG. 1 is a flowchart illustrating a method of performing wireless communication according to example embodiments.

Referring to FIG. 1, a wireless transmission device TXD and a wireless reception device RXD may support a burst type block acknowledgement (BA). The burst type BA is distinguished from a bitmap type BA defined in the IEEE 802.11 standard, and the burst type BA is newly defined in the present disclosure. The wireless reception device RXD supporting the burst type BA may perform the burst type BA as well as the bitmap type BA, and the wireless transmission device TXD supporting the burst type BA may interpret the burst type BA performed by the wireless reception device RXD. Example embodiments in which the wireless transmission device TXD supports the burst type BA but the wireless reception device RXD does not support the burst type BA will be described below with reference to FIG. 7.

The wireless transmission device TXD may generate an Aggregate-MPDU (A-MPDU) including a plurality of Media Access Controller (MAC) Protocol Data Units (MPDUs) and transmission sequence numbers of the plurality of MPDUs (S1000).

Each of the plurality of MPDUs is a data unit in which a MAC header and a frame check sequence (FCS) are combined with a MAC service data unit (MSDU) that is payload data, the transmission sequence numbers are sequence numbers indicating the plurality of MPDUs, respectively. The A-MPDU is a data unit in which the plurality of MPDUs are aggregated. The A-MPDU may satisfy the IEEE 802.11 standard.

In example embodiments, the number of the plurality of MPDUs aggregated in the A-MPDU may be limited to a number smaller than a maximum or highest aggregation number. However, when the wireless reception device RXD supports the burst type BA, the wireless transmission device TXD may aggregate the same number of MPDUs as, or a similar number of MPDUs to, a maximum or highest aggregation number to the A-MPDU without reducing the number of MPDUs aggregated in the A-MPDU, and may transmit the A-MPDU to the wireless reception device RXD. The maximum or highest aggregation number refers to the number of MPDUs that may be aggregated to the A-MPDU based on an aggregation capability of the wireless transmission device and/or a size of a reception buffer of the wireless reception device RXD. The maximum or highest aggregation number will be described below with reference to FIGS. 5 to 7.

In example embodiments, the transmission sequence numbers may be stored in a sequence control field of a MAC header and may be transmitted together with the plurality of MPDUs. The wireless transmission device may retain the transmission sequence numbers until a new A-MPDU to be transmitted subsequent to the A-MPDU is transmitted. Hereinafter, the transmission sequence numbers will be described.

Figure 2:
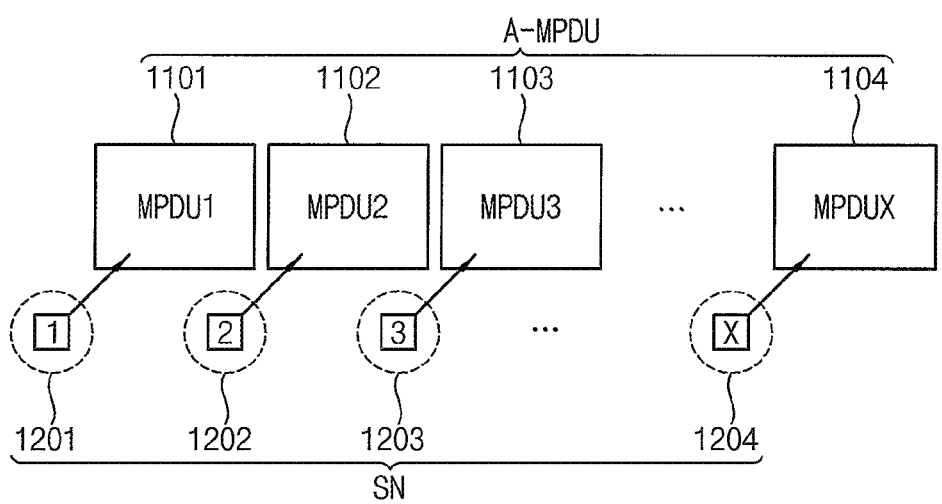
FIG. 2 is a diagram for describing transmission sequence numbers in FIG. 1.

FIG. 2 is a diagram for describing transmission sequence numbers in FIG. 1.

Referring to FIG. 2, a plurality of MPDUs, e.g., a first MPDU 1101, a second MPDU 1102, a third MPDU 1103 and an X-th MPDU 1104, where X is an integer greater than or equal to 4, may be aggregated in an A-MPDU.

In example embodiments, each of transmission sequence numbers may be assigned to each of a plurality of MPDUs aggregated in an A-MPDU by the wireless transmission device TXD for transmission to the wireless reception device RXD. The sequence numbers SN indicating the plurality of MPDUs may be assigned to the plurality of MPDUs, respectively. For example, a sequence number '1' 1201 may be assigned for the first MPDU 1101, a sequence number '2' 1202 may be assigned for the second MPDU 1102, a sequence number '3' 1203 may be assigned for the third MPDU 1103 and a sequence number 'X' 1204 may be assigned for the X-th MPDU 1104. In example embodiments, a sequence number indicating a certain MPDU may be used to refer to the certain MPDU. For example, a MPDU to which a sequence number 'K' is assigned may be referred to as a MPDU 'K' (MPDUK).

In FIG. 2, an example in which X MPDUs, e.g., MPDUs '1' to 'X' 1101, 1102, 1103 and 1104 are aggregated in an A-MPDU is illustrated, but the number of MPDUs aggregated in an A-MPDU is merely an example.

Referring back to FIG. 1, the wireless transmission device TXD may transmit the A-MPDU to the wireless reception device RXD (S2000), and the wireless reception device (RXD) may receive the A-MPDU (S3000). Accordingly, the A-MPDU may be transmitted from the wireless transmission device TXD to the wireless reception device RXD. However, the wireless reception device RXD may not always be able to successfully receive all of the MPDUs aggregated in the A-MPDU by the wireless transmission device TXD. When a receiving error occurs in a process of receiving the A-MPDU, the wireless reception device RXD may successfully receive only a portion of the MPDUs aggregated in the A-MPDU.

The wireless reception device RXD may generate burst information based on the consecutiveness of success sequence numbers (S4000). According to example embodiments, the wireless reception device RXD may generate the burst information based on the success sequence numbers in operation S4000. The wireless reception device RXD may transmit a BA frame based on the burst information to the wireless transmission device TXD (S5000). The wireless transmission device TXD may receive the BA frame (S6000).

The success sequence numbers correspond to sequence numbers of MPDUs that are successfully received by the wireless reception device RXD among the plurality of MPDUs. The burst information may refer to information generated based on consecutive sequence numbers among the success sequence numbers when the wireless reception device RXD supporting the burst type BA performs the burst type BA.

As will be described below with reference to FIGS. 8 and 11, the burst information may be converted to burst type BA data and the burst type BA data may be converted to burst type BA frame to transmit to the wireless transmission device TXD. Hereinafter, the burst information will be described.

Figure 3:
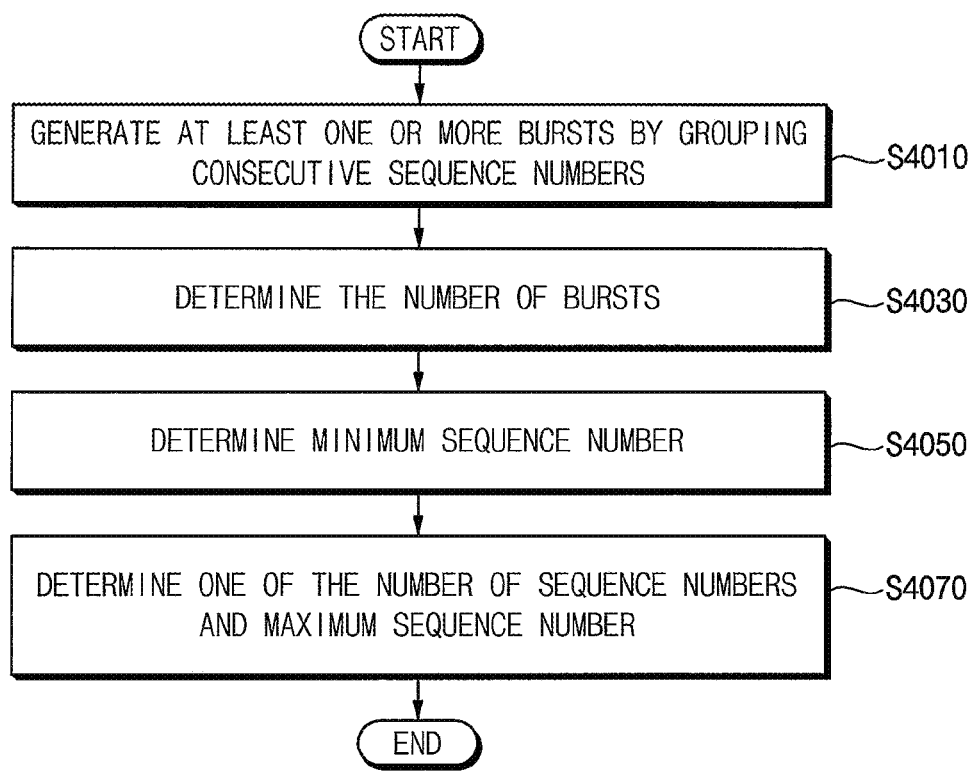
FIG. 3 is a flowchart illustrating example embodiments of generating burst information in FIG. 1.

FIG. 3 is a flowchart illustrating example embodiments of generating burst information in FIG. 1.

Referring to FIG. 3, a wireless reception device RXD may generate at least one or more bursts by grouping consecutive sequence numbers among the success sequence numbers (S4010), and determine the number of the bursts (S4030). The wireless reception device RXD may determine a minimum or smallest sequence number that is the smallest number among sequence numbers included in each of the bursts (S4050), and determine one of the number of the sequence numbers included in each of the bursts, and a maximum or largest sequence number that is the largest number among sequence numbers included in each of the bursts (S4070).

In example embodiments, the burst information may be used to predict a size of burst type BA data and/or a size of bitmap type BA data, may be included in the burst type BA data under certain conditions, and may be used to generate the burst type BA data.

Figure 4:
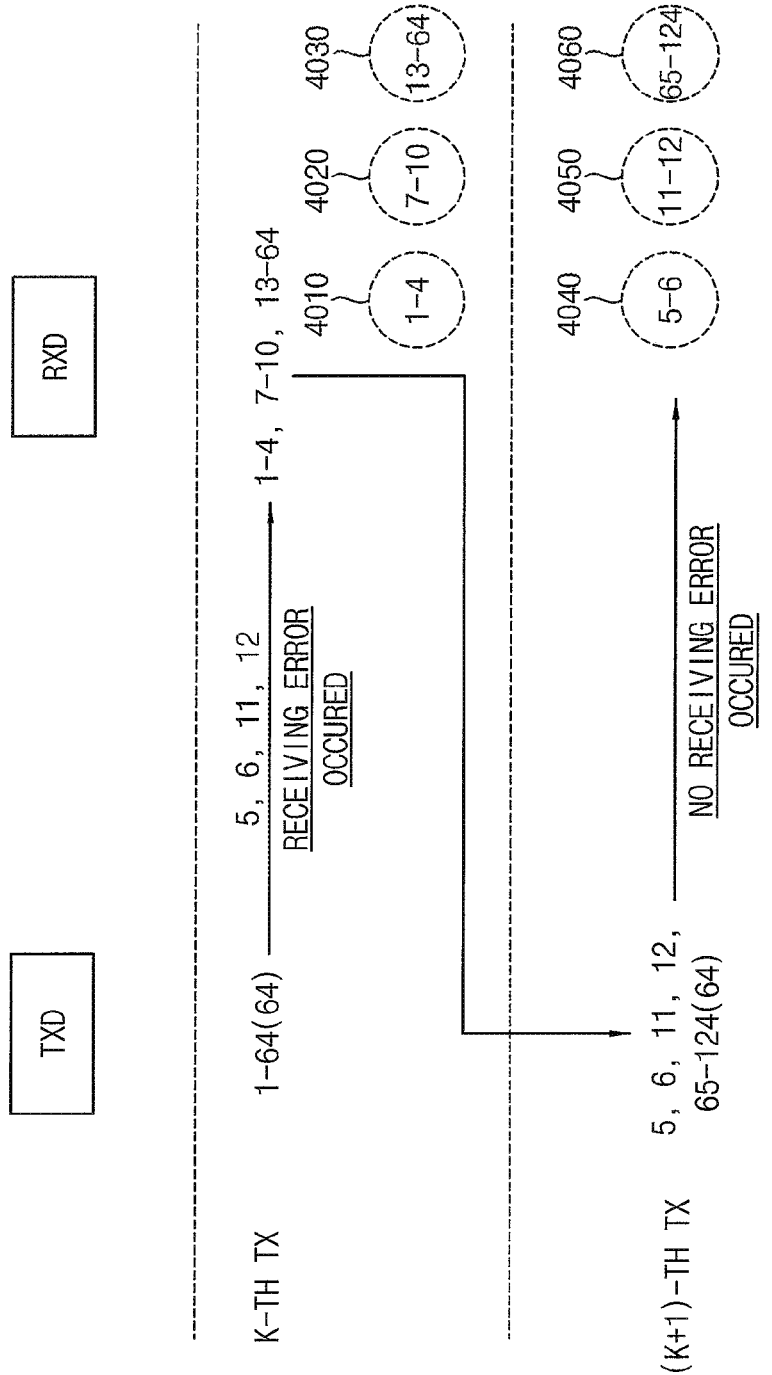
FIG. 4 is a diagram for describing a process of generating burst information in FIG. 1.

FIG. 4 is a diagram for describing a process of generating burst information in FIG. 1.

In FIG. 4, a K-th transmission K-th TX and a (K+1)-th transmission (K+1)-th TX, where K is an integer greater than or equal to 1, are illustrated. It is assumed that a wireless reception device RXD may perform burst type BA and a maximum or highest aggregation number is 64. In each of the transmission K-th TX and (K+1)-th TX, operations S1000 to S6000 illustrated in FIG. 1 may be performed.

In the K-th transmission K-th TX, the wireless transmission device TXD may aggregate MPDUs '1' to '64', e.g., a total of 64 MPDUs in an A-MPDU, to transmit the A-MPDU, and retain sequence numbers, e.g., 1 to 64, indicating the transmitted MPDUs.

When the wireless reception device RXD receives the A-MPDU but a receiving error occurs for MPDUs '5', '6', '11' and '12', the wireless reception device RXD may generate burst information based on the consecutiveness of success sequence numbers corresponding to sequence numbers of MPDUs that are successfully received among the MPDUs '1' to '64'. In this case, transmission sequence numbers are '1' to '64', and the success sequence numbers are '1' to '4', '7' to '10' and '13' to '64'.

In example embodiments, the wireless reception device RXD may classify success sequence numbers to group consecutive success sequence numbers into one group. Each group generated as a result of the grouping may be referred to as a 'burst'.

In example embodiments, the burst information may include information on first to third bursts 4010, 4020 and 4030. The burst information may include information on the number of the bursts, a minimum or smallest sequence number that is the smallest number among the consecutive sequence numbers included in each of the bursts, and/or the burst information may include one of the number of the sequence numbers included in each of the bursts, and/or a maximum or largest sequence number that is the largest number among sequence numbers included in each of the bursts. For example, in the K-th transmission K-th TX, the number of bursts is '3'. For the first burst 4010, the minimum or smallest sequence number is '1', the number of the sequence numbers is '4', and the maximum or largest sequence number is '4'. For the second burst 4020, the minimum or smallest sequence number is '7', the number of the sequence numbers is '4', and the maximum or largest sequence number is '10'. For the third burst 4030, the minimum or smallest sequence number is '13', the number of the sequence numbers is '52', and the maximum or largest sequence number is '64'.

When the wireless reception device RXD generates a BA frame based on the burst information and transmits the BA frame to the wireless transmission device TXD, the wireless transmission device TXD may select MPDUs to be retransmitted in the (K+1)-th transmission (K+1)-th TX based on the burst information and transmission sequence numbers corresponding to the transmission of the A-MPDU.

In the (K+1)-th transmission (K+1)-th TX, the wireless transmission device TXD may aggregate a total of 64 MPDUs, including MPDUs '5', '6', '11' and '12' in which the receiving error occurs in the K-th transmission K-th TX, in an A-MPDU and transmit the A-MPDU. That is, the wireless transmission device TXD may aggregate MPDUs '5', '6', '11', '12', and '65' to '124', e.g., a total of 64 MPDUs in an A-MPDU to transmit the A-MPDU, and retain transmission sequence numbers, e.g., '5', '6', '11', '12', and '65' to '124', indicating the transmitted MPDUs.

When the wireless reception device RXD receives the A-MPDU and successfully receives all of the MPDUs aggregated in the received A-MPDU, the wireless reception device RXD may generate burst information based on the consecutiveness of success sequence numbers corresponding to sequence numbers of MPDUs that are successfully received among the MPDUs '5', '6', '11', '12', and '65' to '124'. In this case, transmission sequence numbers are '5', '6', '11', '12', and '65' to '124', and the success sequence numbers are the same as, or similar to, the transmission sequence numbers.

In example embodiments, the wireless reception device RXD may classify success sequence numbers to group consecutive success sequence numbers into one group. The burst information may include information on a fourth to sixth bursts 4040, 4050 and 4060.

Figure 5:
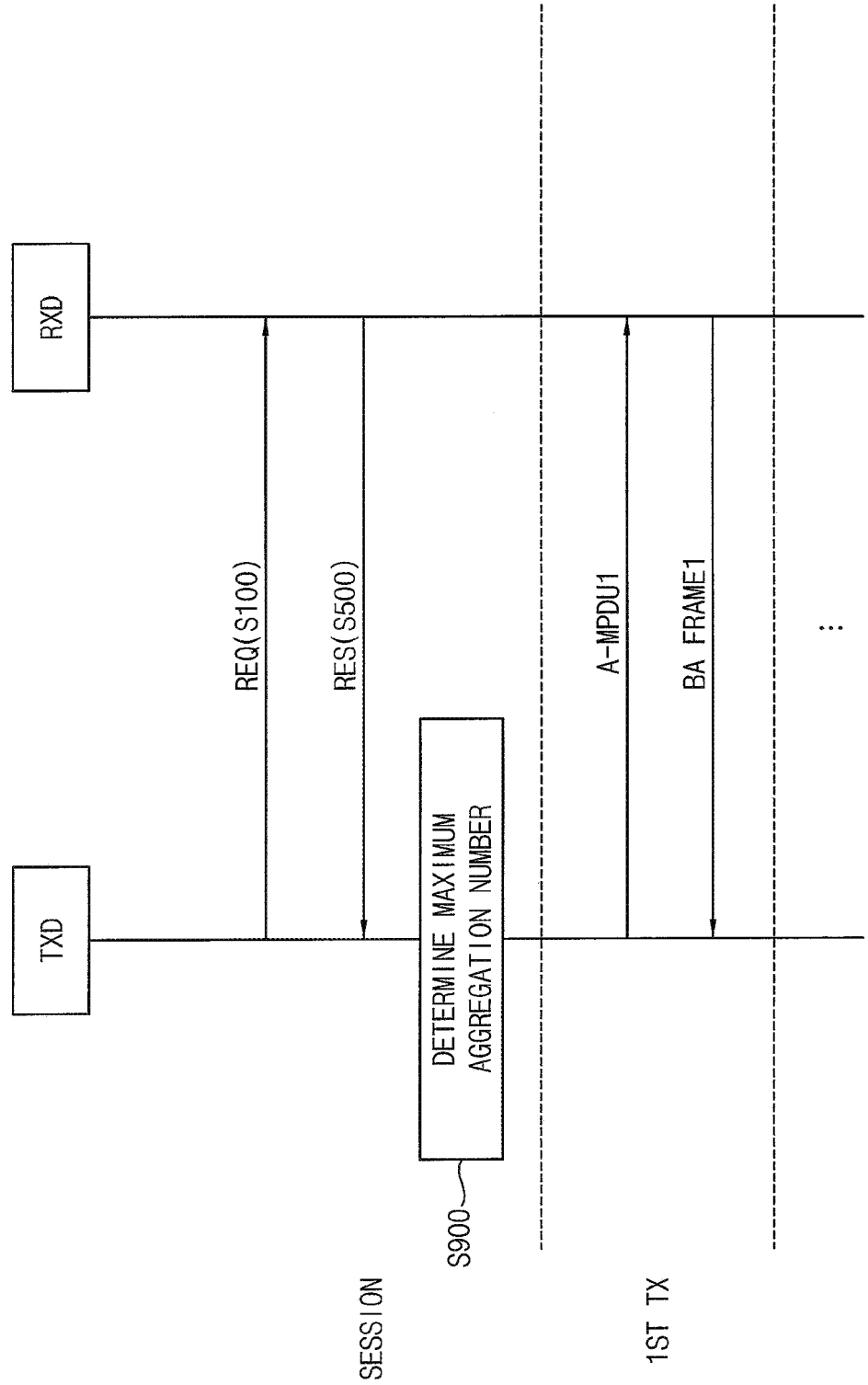
FIG. 5 is a flowchart illustrating a method of performing wireless communication according to example embodiments.

FIG. 5 is a flowchart illustrating a method of performing wireless communication according to example embodiments.

In FIG. 5, a first transmission 1ST TX and a session process SESSION preceding the first transmission 1ST TX are illustrated. The first transmission 1ST TX corresponds to the K-th transmission K-th TX described above with reference to FIG. 4. Thus, redundant descriptions will be omitted.

Referring to FIG. 5, in the session process SESSION, the wireless transmission device TXD may transmit a request signal REQ for requesting information on a size of a reception buffer of the wireless reception device RXD to the wireless reception device RXD (S100).

The wireless reception device RXD may transmit a response signal RES in response to the request signal REQ to the wireless transmission device TXD (S500).

In example embodiments, the request signal REQ and the response signal RES may be signals obtained by partially modifying formats of an ADD Block Acknowledgement (ADDBA) request signal and an ADDBA response signal defined in the IEEE 802.11 standard, respectively. A specific form of the response signal RES will be described below with reference to FIGS. 8A and 8B.

The wireless transmission device TXD may determines a maximum, or highest, aggregation number based on an aggregation capability of the wireless transmission device TXD and the size of the reception buffer of the wireless reception device RXD (S900). As described above with reference to FIG. 1, the maximum or highest aggregation number refers to a maximum or highest number of MPDUs that the wireless transmission device TXD may aggregate in an A-MPDU based on the aggregation capability of the wireless transmission device TXD and the size of the reception buffer of the wireless reception device RXD. Hereinafter, the maximum or highest aggregation number will be described.

FIG. 6 is a diagram for describing a process of determining a maximum aggregation number. As used herein, the maximum aggregation number may also refer to a highest aggregation number.

In FIG. 6, an aggregation capability TXD_AGB of a wireless transmission device TXD, a size of a reception buffer RXD_BFS of a wireless reception device RXD and a maximum aggregation number MAX_AG_NUM are illustrated.

Referring to FIG. 6, the wireless transmission device TXD determines the maximum aggregation number MAX_AG_NUM based on the aggregation capability TXD_AGB and the size of the reception buffer RXD_BFS. More specifically, the wireless transmission device TXD may compare the number of MPDUs corresponding to the aggregation capability TXD_AGB and the number of MPDUs corresponding to the size of the reception buffer RXD_BFS.

In example embodiments, the aggregation capability TXD_AGB may represent a maximum or highest number of MPDUs that the wireless transmission device TXD may transmit by aggregating in an A-MPDU, and the size of the reception buffer RXD_BFS may represent a maximum or highest number of MPDUs that the wireless reception device RXD may temporarily store by receiving the A-MPDU.

In example embodiments, the wireless transmission device TXD may determine the maximum aggregation number MAX_AG_NUM as a smaller one of a first number of MPDUs corresponding to the aggregation capability TXD_AGB and a second number of MPDUs corresponding to the size of the reception buffer RXD_BFS. For example, when the first number and the second number are equal to '64', the maximum aggregation number MAX_AG_NUM may be determined as '64'. When the first number is '64' and the second number is '256', the maximum aggregation number MAX_AG_NUM may be determined as '64'. When the first number is '256' and the second number is '64', the maximum aggregation number MAX_AG_NUM may be determined as '64'. When the first number and the second number are equal to '256', the maximum aggregation number MAX_AG_NUM may be determined as '256'.

FIG. 7 is a flowchart illustrating a method of performing wireless communication according to example embodiments.

In FIG. 7, it is assumed that a wireless transmission device TXD supports a burst type BA but a wireless reception device RXD includes both cases supporting and not supporting the burst type BA. As described above with reference to FIG. 1, the burst type BA is newly defined in the present disclosure and is distinguished from the bitmap type BA defined in IEEE 802.11 standard. The wireless reception device RXD that does not support the burst type BA may perform only the bitmap type BA, the wireless reception device RXD that supports the burst type BA may perform not only the bitmap type BA but also the burst type BA. The wireless transmission device TXD that supports the burst type BA may interpret the burst type BA performed by the wireless reception device RXD.

In FIG. 7, a session process SESSION and a first transmission 1ST TX following the session process are illustrated. The session process corresponds to the session process described above with reference to FIG. 5, and the first transmission 1ST TX corresponds to one of the K-th transmission K-th TX and the (K+1)-th transmission (K+1)-th TX described above with reference to FIG. 4. Since operations having the same or similar reference numerals in FIGS. 4, 5 and 7 perform similar functions, redundant descriptions will be omitted.

Referring to FIGS. 4, 5 and 7, in the session process SESSION, the wireless transmission device TXD may transmit a request signal REQ for requesting information on a size of a reception buffer of the wireless reception device RXD and information on whether the burst type BA is supported to the wireless reception device RXD (S100a). The wireless reception device RXD may transmit a response signal RES to the wireless transmission device TXD in response to the request signal REQ (S500a).

In example embodiments, the request signal and the response signal may be signals obtained by partially modifying formats of ADDBA request signal and ADDBA response signal defined in IEEE 802.11 standard. Hereinafter, the response signal RES will be described.

Figure 8A:
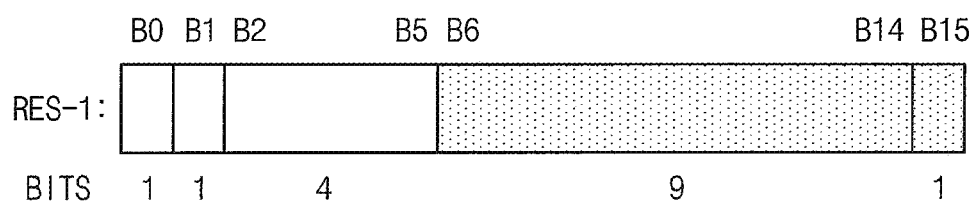
FIGS. 8A and 8B are diagrams illustrating an example of response signals in FIGS. 5 and 7.
Figure 8B:
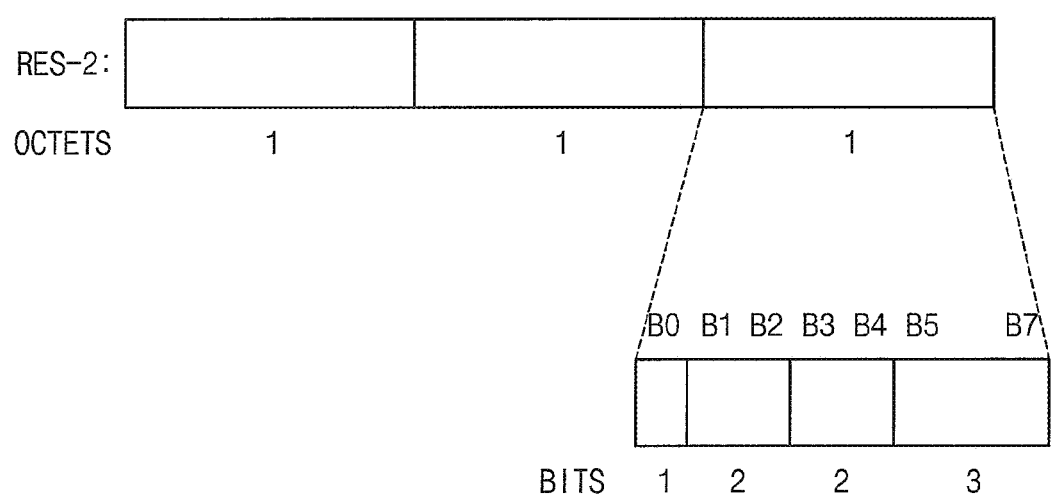

FIGS. 8A and 8B are diagrams illustrating an example of response signals illustrated in FIGS. 5 and 7.

In FIG. 8A, a response signal RES-1 may be a signal obtained by partially modifying a BA parameter set field according to the IEEE 802.11 standard, and in FIG. 8B, the response signal RES-2 may be a signal using an ADDBA extension element according to the IEEE 802.11 standard.

In example embodiments, a wireless reception device RXD may store the response signal RES-1 to the ADDBA response frame according to the IEEE 802.11 standard to transmit the ADDBA response frame to a wireless transmission device TXD. The wireless reception device RXD may add the response signal RES-2 to the ADDBA response frame to transmit the ADDBA response frame to the wireless transmission device TXD.

Referring to FIGS. 5, 7 and 8A, the response signal RES-1 includes a plurality of fields represented by a total of 16 bits 'B0' to 'B15'. For example, the plurality of fields may be represented by 1 bit, 1 bit, 4 bits, 9 bits and 1 bit, respectively.

In example embodiments, the field(s) represented by 'B0' to 'B5' bits may be a field according to IEEE 802.11 standard, the field represented by 'B6' to 'B14' bits may be a field similar to a field according to the standard but performing a changed function, and the field represented by 'B15' bits may be a field that is not defined in the standard and is newly added by the present disclosure.

In example embodiments, the field represented by 'B0' bit may represent whether to allow an A-MSDU in which a plurality of MSDUs are aggregated in an MPDU. The field represented by 'B1' bit may represent whether to immediately or promptly perform a BA. The field represented by 'B2' to 'B5' bits may represent a traffic identifier that is a target of the BA. The field represented by 'B6' to 'B14' bits may represent the size of the reception buffer of the wireless reception device RXD. The field represented by 'B15' bit may represent whether the wireless reception device RXD may perform (e.g., supports) the burst type BA.

Referring to FIGS. 5, 7 and 8B, the response signal RES-2 includes a plurality of fields represented by a total of 24 bits, E.G., 3-octets. For example, each of the plurality of fields may be represented by 8 bits. One of the plurality of fields may include a plurality of subfields. For example, the plurality of subfields may be represented by 1 bit, 2 bits, 2 bits and 3 bits, respectively.

In example embodiments, the subfield represented by 'B0' bit may represent whether fragmented MSDUs may be aggregated in an MPDU in an environment where the BA is performed, the subfield represented by 'B1' bit and 'B2' bit may represent a dynamic fragmentation level, and the subfield represented by 'B3' bit and 'B4' bit may represent an area reserved for future use. The subfield represented by 'B5' to 'B7' bits may represent an element representing an increased size of the reception buffer by constructing an equation together with the size of the reception buffer stored in the BA parameter set field.

In example embodiments, at least one of 'B3' bit and 'B4' bit may represent whether the wireless reception device RXD may perform the burst type BA.

Referring back to FIGS. 4, 5 and 7, The wireless transmission device TXD may determine a maximum aggregation number based on an aggregation capability of the wireless transmission device TXD and the size of the reception buffer of the wireless reception device RXD (S900).

The wireless transmission device TXD may determine whether the wireless reception device RXD supports the burst type BA or whether the transmission sequence numbers of a transmission buffer of the wireless transmission device TXD are consecutive (S1010).

In example embodiments, whether the wireless reception device RXD supports the burst type BA may be determined based on the response signal according to the operation S500a. Whether the transmission sequence numbers of the transmission buffer are consecutive may be determined based on transmission sequence numbers indicating MPDUs waiting to be transmitted in the transmission buffer of the wireless transmission device TXD.

When the wireless reception device RXD supports the burst type BA or the transmission sequence numbers of the transmission buffer are consecutive (S1010: YES), the wireless transmission device TXD may generate an A-MPDU by aggregating the same number of MPDUs as, or a similar number of MPDUs to, the maximum aggregation number (S1030).

In example embodiments, the case in which the transmission sequence numbers of the transmission buffer are consecutive may include a case in which the wireless reception device RXD does not support the burst type BA.

When the wireless reception device RXD does not support the burst type BA and the transmission sequence numbers of the transmission buffer are not consecutive (S1010: NO), the wireless transmission device TXD may generate an A-MPDU by aggregating a number of MPDUs less than the maximum aggregation number (S1050). That is, when the wireless reception device RXD does not support the burst type BA and the transmission sequence numbers of the transmission buffer are not consecutive, unlike the operation S1030, there may be a case in which the wireless transmission device TXD aggregates only a number of MPDUs less than the maximum aggregation number.

The bitmap type BA is a BA defined in IEEE 802.11 standard as described above with reference to FIG. 1, when the wireless reception device RXD performs the bitmap type BA, the wireless reception device RXD may perform the BA for sequence numbers corresponding from a minimum or smallest sequence number among the success sequence numbers to a sequence number increased by a predetermined or alternatively, given number. That is, when the wireless reception device RXD does not support the burst type BA, the wireless reception device RXD does not perform the burst type BA and may only perform the bitmap type BA. In this case, even if the wireless transmission device TXD aggregates a number of MPDUs of the maximum aggregation number in one A-MPDU and transmits the A-MPDU, the wireless reception device RXD does not perform BA on all of MPDUs of the maximum aggregation number. Thus, when the wireless reception device RXD does not support the burst type BA and the transmission sequence numbers of the transmission buffer are not consecutive, the wireless transmission device TXD may aggregate and transmit to the wireless reception device RXD only as many MPDUs as the wireless reception device RXD may perform the bitmap type BA.

The wireless transmission device TXD may transmit the A-MPDU generated according to the operation S1000a to the wireless reception device RXD (S2000). The wireless reception device RXD may generate burst information based on the consecutiveness of the success sequence numbers (S4000). The wireless reception device RXD may transmit a BA frame that is based on the burst information to the wireless transmission device TXD (S5000). The wireless transmission device TXD may receive the BA frame (S6000).

The success sequence numbers correspond to sequence numbers of MPDUs that are successfully received among the plurality of MPDUs. The burst information is information generated based on consecutive sequence numbers among the success sequence numbers when the wireless reception device RXD supporting the burst type BA performs the burst type BA. The bitmap information is information generated based on sequence numbers corresponding from a minimum or smallest sequence number among the success sequence numbers to a sequence number increased by a predetermined or alternatively given number when the wireless reception device RXD not supporting the burst type BA performs the bitmap type BA. As will be described below with reference to FIGS. 9 to 13, the burst information may be converted to burst type BA data, and then converted to burst type BA frame, and transmitted to the wireless transmission device TXD. The bitmap information may be converted to bitmap type BA data, and then converted to the bitmap type BA frame, and then transmitted to the wireless transmission device TXD.

Figure 9:
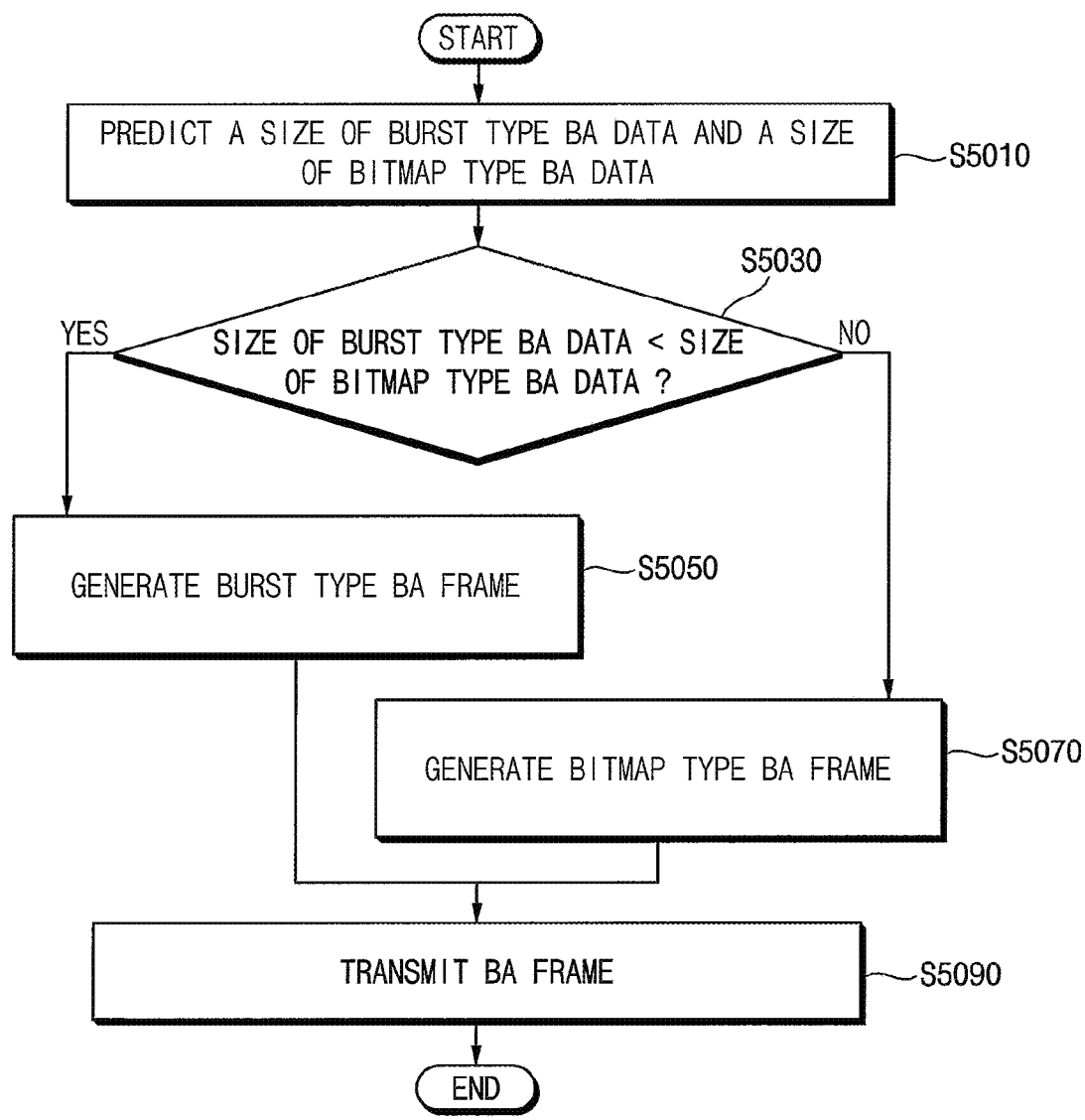
FIG. 9 is a flowchart illustrating example embodiments of transmitting a block acknowledgement (BA) frame in FIG. 7.

FIG. 9 is a flowchart illustrating example embodiments of transmitting BA frame in FIG. 7.

Referring to FIGS. 7 and 9, in the operation of transmitting the BA frame S5000, the wireless reception device RXD may predict (e.g., determine) a size of burst type BA data including the burst information and a size of bitmap type BA data based on the number of bursts (S5010), and compare the size of the burst type BA data with the size of the bitmap type BA data (S5030). The wireless reception device RXD may generate the BA frame by comparing the size of the burst type BA data and the size of the bitmap type BA data (S5050, S5070). Specifically, when the size of the burst type BA data is smaller than or equal to the size of the bitmap type BA data (S5030: YES), the wireless reception device RXD may generate a burst type BA frame including the burst type BA data as the BA frame (S5050). When the size of the burst type BA data is larger than the size of the bitmap type BA data (S5030: NO), the wireless reception device RXD may generate a bitmap type BA frame including the bitmap type BA data as the BA frame (S5070).

The wireless reception device RXD may transmit the BA frame to the wireless transmission device TXD (S5090). However, the scope of the present disclosure is not limited thereto. In example embodiments, when the size of the burst type BA data is larger than the size of the bitmap type BA data in the operation S5030 (S5030: NO), the wireless reception device RXD may reduce the size of the burst type BA data by limiting the number of bursts to within a predetermined or alternatively, given maximum (or highest) number of bursts, and may generate the burst type BA frame including the burst type BA data as the BA frame. Hereinafter, the BA frame, the bitmap type BA data, and the burst type BA data will be described.

Figure 10:
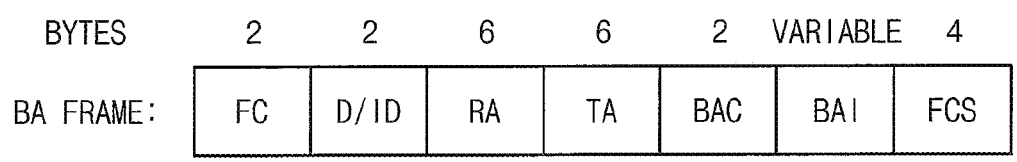
FIG. 10 is a diagram illustrating example embodiments of a BA frame in FIGS. 1 and 7.

FIG. 10 is a diagram illustrating example embodiments of a BA frame in FIGS. 1 and 7.

Referring to FIGS. 1, 7 and 10, a BA frame includes a plurality of fields represented by a fixed size indicated by a total of 22 bytes and a variable size. For example, each of the plurality of fields may be represented by a fixed size of 2 bytes, 2 bytes, 6 bytes, 6 bytes, 2 bytes and 4 bytes, and the variable size.

In example embodiments, the plurality of fields may include a frame control field FC, a duration/ID field D/ID, an RA field RA, a TA field TA, a BA control field BAC, a BA information field BAI and a frame check sequence field FCS. The frame control field FC may represent control information used for performing wireless communication, the duration/ID field D/ID may represent duration or identification (ID) information according to a type of frame, the RA field RA may represent the MAC address of an AP receiving the frame when the frame is transmitted via the AP, and the TA field TA may represent the MAC address of an AP transmitting the frame when the frame is transmitted via the AP. In example embodiments, the plurality of fields may be fields according to IEEE 802.11 standard.

In example embodiments, the BA control field BAC may represent whether data stored in the BA information field BAI is the burst type BA data or the bitmap type BA data. That is, the BA control field BAC may represent which type of BA between the burst type BA and the bitmap type BA is performed by the wireless reception device RXD. In example embodiments, either the burst type BA data or the bitmap type BA data may be stored in the BA information field BAI.

As described above with reference to FIGS. 7 and 9, the wireless reception device RXD may transmit the BA frame to the wireless transmission device TXD, and the wireless transmission device TXD may receive the BA frame transmitted by the wireless reception device RXD. In this case, the wireless transmission device TXD supporting the burst type BA may interpret the burst information stored in the BA information field BAI based on a portion of bits of the BA control field BAC and a portion of bits of the BA information field BAI. Further, the wireless transmission device TXD may know (e.g., determine) whether the BA performed by the wireless reception device RXD is the burst type BA or the bitmap type BA based on a portion of bits of the BA control field BAC and the BA information field BAI. A method of representing that the burst information is stored in the BA information field BAI will be described below with reference to FIGS. 12 and 13.

Figure 11:
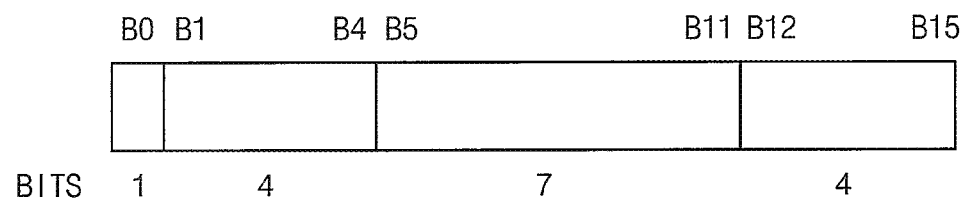
FIG. 11 is a diagram illustrating example embodiments of a BA control field in FIG. 10.

FIG. 11 is a diagram illustrating example embodiments of a BA control field in FIG. 10.

Referring to FIGS. 1, 10 and 11, a BA control field BAC includes a plurality of fields represented by a total of 16 bits 'B0' to 'B15'. For example, the plurality of fields may be represented by 1 bit, 4 bits, 7 bits and 4 bits, respectively.

In example embodiments, the field represented by 'B0' to 'B15' bits may be a field according to IEEE 802.11 standard.

In example embodiments, the field represented by 'B0' bit may represent a BA policy, the field represented by 'B1' to 'B4' bits may represent a BA type, the field represented by 'B5' to 'B11' bits may represent an area reserved for future use, and the field represented by 'B12' to 'B15' bits may represent whether information on a traffic identifier is transmitted.

In example embodiments, the 'B5' bit may represent whether data stored in the BA information field BAI is the burst type BA data or the bitmap type BA data.

Figure 12:
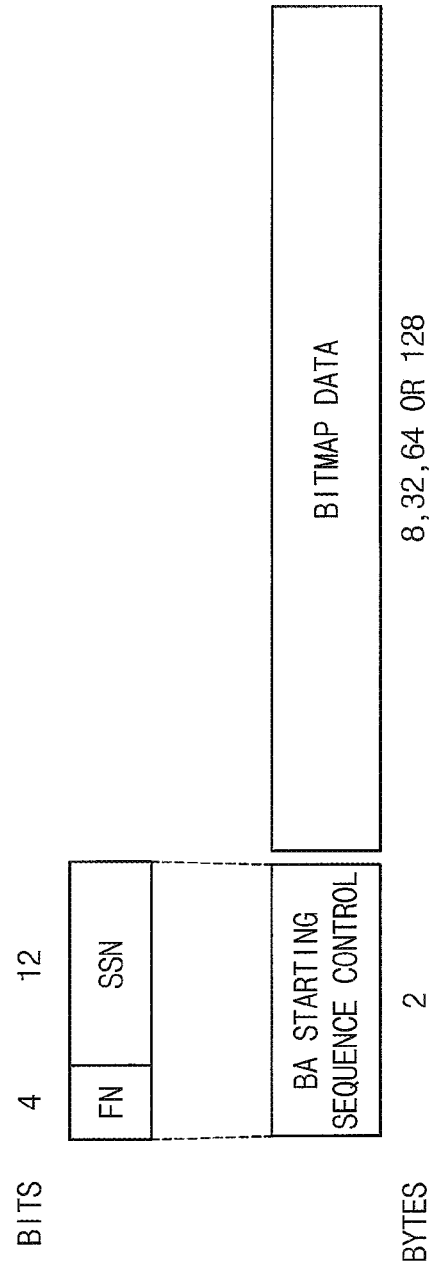
FIG. 12 is a diagram illustrating example embodiments of bitmap type BA data stored in a BA information field in FIG. 10.

FIG. 12 is a diagram illustrating example embodiments of bitmap type BA data stored in a BA information field in FIG. 10.

Referring to FIGS. 1, 7, 9, 10 and 12, when the wireless reception device RXD performs the bitmap type BA, the wireless reception device RXD may perform the BA for sequence numbers corresponding from a minimum or smallest sequence number among the success sequence numbers to a sequence number increased by a predetermined or alternatively, given number.

In example embodiments, the bitmap type BA data may include a BA starting sequence control field and a bitmap data field. The BA starting sequence control filed may include a fragment number field FN and a start sequence number field SSN.

In example embodiments, a portion of bits representing that the burst information is stored in the BA information field BAI may be stored in the fragment number field FN as described above with reference to FIGS. 10 and 11. In the start sequence number field SSN, the minimum or smallest number among the success sequence numbers may be stored. In the bitmap data field, a plurality of bits may be stored corresponding to sequence numbers from the minimum or smallest number among the success sequence number to a sequence number increased by the predetermined or alternatively given number. For example, each of the plurality of bits may represent MPDUs that are successfully received as '1' and MPDUs that are not received or not transmitted as '0'.

In example embodiments, the BA starting sequence control field may be represented by 2 bytes, and the bitmap data field may be represented by one of predetermined or alternatively given 64 bits, 256 bits, 512 bits and 1024 bits, e.g., 8 bytes, 32 bytes, 64 bytes and 128 bytes, according to the IEEE 802.11 standard. For example, when the wireless reception device RXD performs the BA for sequence numbers corresponding from a minimum or smallest number among the success sequence numbers to a number increased by 64, the bitmap data field may be represented by 64 bits, e.g., 8 bytes. When the wireless reception device RXD performs the BA for consecutive sequence numbers corresponding from a minimum or smallest number among the success sequence numbers to a number increased by 256, the bitmap data field may be represented by 256 bits, e.g., 32 bytes. For example, when the wireless reception device RXD performs the BA for sequence numbers corresponding from a minimum or smallest number among the success sequence numbers to a number increased by 512, the bitmap data field may be represented by 512 bits, e.g., 64 bytes. When the wireless reception device RXD performs the BA for consecutive sequence numbers corresponding from a minimum or smallest number among the success sequence numbers to a number increased by 1024, the bitmap data field may be represented by 1024 bits, e.g., 128 bytes.

Figure 13:
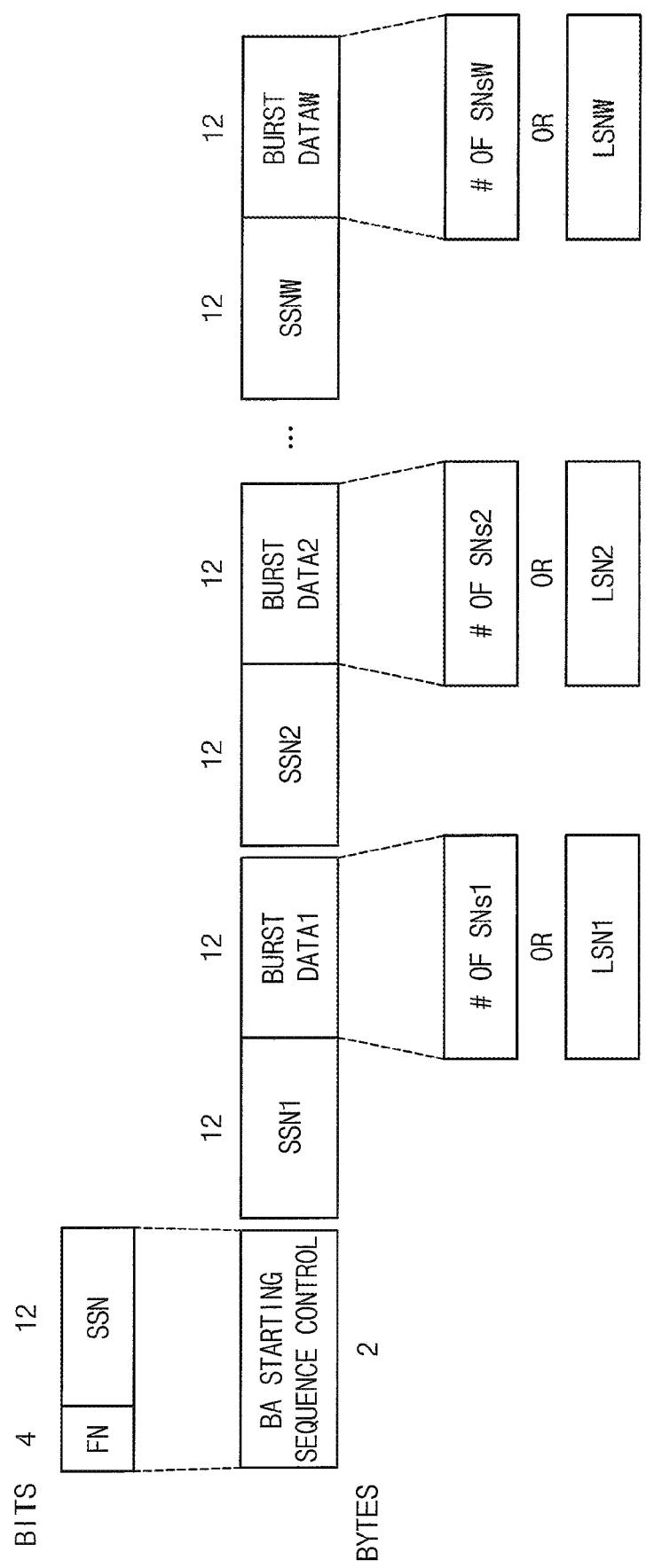
FIG. 13 is a diagram illustrating example embodiments of burst type BA data in a BA information field in FIG. 10.

FIG. 13 is a diagram illustrating example embodiments of burst type BA data in a BA information field in FIG. 10.

Referring to FIGS. 1, 7, 9, 10 and 13, when the wireless reception device RXD performs the burst type BA, the wireless reception device RXD may perform the BA based on successive sequence numbers among the success sequence numbers.

In example embodiments, assuming that the number of bursts is 'W', the burst type BA data may include a BA start sequence control field, a first start sequence field SSN1, a first burst data field BURST DATA1, a second start sequence field SSN2, a second burst data field BURST DATA2, a W-th start sequence field SSNW, where W is a natural number greater than or equal to 3, and/or a W-th burst data field BURST DATAW. The BA start sequence control field may include a fragment number field FN and/or a start sequence number field SSN. According to example embodiments, the BA information field (e.g., the burst type BA data in the BA information field) may be represented by at least 5 bytes.

In example embodiments, a portion of bits representing that the burst information is stored in the BA information field BAI may be stored in the fragment number field FN as described above with reference to FIGS. 10 and 11. However, the scope of example embodiments is not limited thereto.

In example embodiments, when a type of information stored in the BA information field BAI is represented by only a portion of bits of the BA control field BAC, other information for performing a function according to the IEEE 802.11 standard may be stored in the fragment number field FN. In this case, the burst type BA data may be configured to include only a start sequence number field SSN instead of the BA start sequence control field. That is, the wireless reception device RXD may perform the burst type BA as the burst type BA data in which the fragment number field FN is removed from the burst type BA data illustrated in FIG. 13.

In example embodiments, the number of bursts described above with reference to FIG. 9 may be stored (e.g., represented, indicated, etc.) in the start sequence number field SSN. For example, when a total of 'W' bursts are generated as a result of grouping the consecutive success sequence numbers into one group by classifying success sequence numbers, the 'W' may be stored in the start sequence number field SSN.

In example embodiments, a minimum or smallest number among sequence numbers included in each of the bursts may be stored (e.g., represented, indicated, etc.) in the first start sequence field SSN1, the second start sequence field SSN2 and/or the W-th start sequence field SSNW. For example, success sequence numbers included in a certain burst are 'P' to 'P+Q-1', the 'P' may be stored in a V-th start sequence field SSNV, where V is a natural number greater than or equal to '1' and less than or equal to 'W'.

In example embodiments, the number of sequence numbers '# OF SNs1', '# of SNs2' and/or '# OF SNsW' included in each of the bursts may be stored (e.g., represented, indicated, etc.) in the first burst data field BURST DATA1, the second burst data field BURST DATA2 and/or the W-th burst data field BURST DATAW, respectively. For example, when success sequence numbers included in a certain burst are 'P' to 'P+Q-1', the 'Q' may be stored in the V-th burst data field BURST DATAV. However, the scope of the present disclosure is not limited thereto.

In example embodiments, maximum or largest sequence numbers 'LSN1', 'LSN2' and/or 'LSNW' that are the largest numbers of sequence numbers included in each of the bursts may be stored (e.g., represented, indicated, etc.) in the first burst data field BURST DATA1, the second burst data field BURST DATA2 and/or the W-th burst data field BURST DATAW, respectively. For example, when success sequence numbers included in a certain burst are 'P' to 'P+Q-1', the 'P+Q-1' may be stored in the V-th burst data field BURST DATAV.

In example embodiments, the BA start sequence control field may be represented by 2 bytes, the fragment number field FN may be represented by 4 bits, and the start sequence number field SSN may be represented by 12 bits. However, the scope of the present disclosure is not limited thereto.

In example embodiments, when a type of information stored in the BA information field BAI is represented by only a portion of bits of the BA control field BAC, and when the burst type BA data is configured to include only a start sequence number field SSN instead of the BA start sequence control field, the start sequence number field SSN may be represented by bits smaller than 12 bits based on an environment in which a wireless communication described above with reference to FIG. 1 is normally performed. For example, assuming that the number of bursts generated in a normal wireless communication is 'W', the start sequence number field SSN may be represented by bits smaller than ($\log_2 W$) bits.

In example embodiments, each of the first start sequence field SSN1, the second start sequence field SSN2 and/or the W-th start sequence field SSNW may be represented by 12 bits, and each of the first burst data field BURST DATA1, the second burst data field BURST DATA2 and/or the W-th burst data field BURST DATA2 may be represented by 12 bits.

Figure 14:
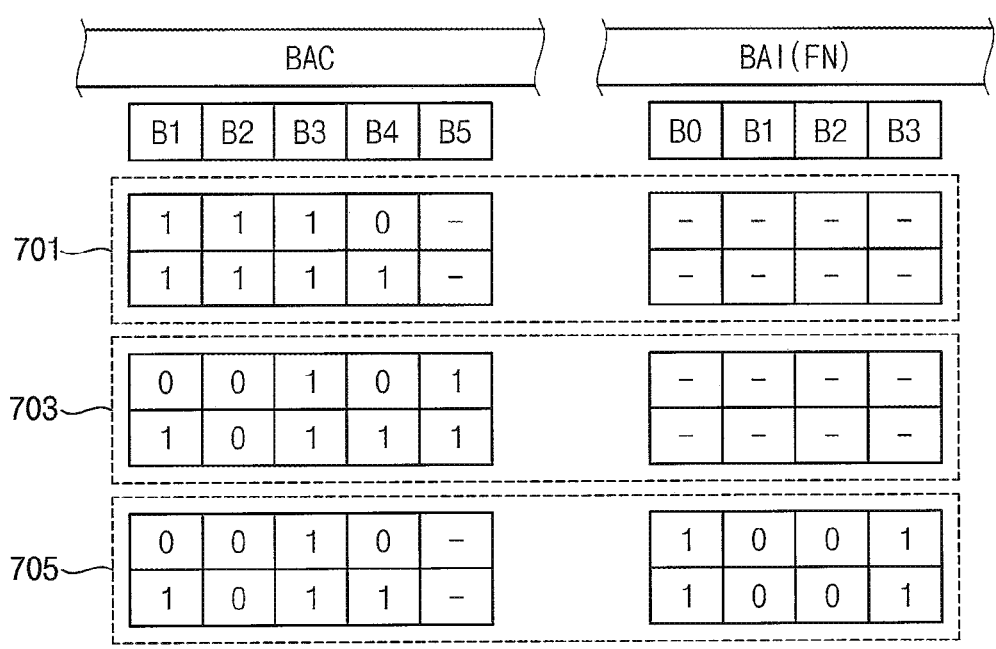
FIG. 14 is a diagram for describing a method of representing a type of BA data stored in a BA information field in FIG. 10.

FIG. 14 is a diagram for describing a method of representing a type of BA data stored in BA information field in FIG. 10.

As described above with reference to FIG. 10, a portion of bits of each of the BA control field BAC and the BA information field BAI may represent that the burst information is stored in the BA information field BAI.

In FIG. 14, 'B1' to 'B5' bits as a portion of bits of the BA control field BAC described above with reference to FIG. 10 are illustrated, and 'B0' to 'B3' bits included in the fragment number field FN as a portion of bits of the BA information field BAI are illustrated.

Referring to FIG. 14, a type of information stored in the BA information field BAI may be represented based on a first to third methods 701, 703 and 705. Each of the first to third methods 701, 703 and 705 corresponds to an independent method, and one of the first to third methods 701, 703 and 705 may represent that the burst information is stored in the BA information field BAI.

When representing the type of information stored in the BA information field BAI according to the first method 701, one of '1110' and '1111' may be written in 'B1' to 'B4' bits of the BA control field BAC to represent that the burst information is stored in the BA information field BAI. In example embodiments, the '1110' and the '1111' are values that are not defined in the IEEE 802.11 standard, the '1110' may represent that the information stored in the BA information field BAI corresponds to 'Compressed' type as the burst information, and the '1111' may represent that the information stored in the BA information field BAI corresponds to 'Multi-STA' type as the burst information.

When representing the type of information stored in the BA information field BAI according to the second method 703, one of '00101' and '10111' may be written in 'B1' to 'B5' bits of the BA control field BAC to represent that the burst information is stored in the BA information field BAI.

In example embodiments, the '0010' and '1011' corresponding to 'B1' to 'B4' bits of the BA control field BAC among the '00101' and '10111' are values that are defined in the IEEE 802.11 standard, the '0010' may represent that the information stored in the BA information field BAI corresponds to 'Compressed' type as the burst information, and the '1011' may represent that the information in the BA information field BAI corresponds to 'Multi-STA'.

In example embodiments, the '1' corresponding to 'B5' bit of the BA control field BAC among the '00101' and '10111' is value that is not defined in the IEEE 802.11 standard, the '1' may represent that the burst information is stored in the BA information field BAI. Accordingly, the '00101' may represent that the information stored in the BA information field BAI corresponds to the 'Compressed' type as the burst information, and the '10111' may represent that the information stored in the BA information field BAI corresponds to the 'Multi-STA' type as the burst information.

In example embodiments, as described above with reference to FIG. 11, a field represented by 'B5' to 'B11' bits of the BA control field BAC is a field representing an area reserved for future use, and in the second method 703, it may be represented by using 'B5' bit of the BA control field BAC that a type of information stored in the BA information field BAI corresponds to the burst information. However, the scope of the present disclosure is not limited thereto.

In example embodiments, it may be represented by using one of 'B6' to 'B11' bits of the BA control field BAC that a type of information stored in the BA information field BAI corresponds to the burst information.

When representing the type of information stored in the BA information field BAI according to the third method 705, one of '0010' and '1011' may be written in 'B1' to 'B4' bits of the BA control field BAC, and '1001' may be written in 'B0' to 'B3' bits included in the fragment number field FN of the BA information field BAI to represent that the burst information is stored in the BA information field BAI.

In example embodiments, the '0010' and the '1011' corresponding to 'B1' to 'B4' bits of the BA control field BAC are values that are defined in the IEEE 802.11 standard, the '0010' may represent that the information stored in the BA information field BAI corresponds to 'Compressed' type as the burst information, and the '1011' may represent that the information stored in the BA information field BAI corresponds to 'Multi-STA' type as the burst information.

In example embodiments, the '1001' corresponding to 'B0' to 'B3' bits included in the fragment number field FN are values that are not defined in the IEEE 802.11 standard, the '1001' may represent that the burst information is stored in the BA information field BAI.

Accordingly, by writing '0010' to 'B1' to 'B4' bits of the BA control field BAC and '1001' to 'B0' to 'B3' bits of the fragment number field FN of the BA information field BAI, it may represent that the information stored in the BA information field BAI corresponds to the 'Compressed' type as the burst information, and by writing '1011' to 'B1' to 'B4' bits of the BA control field BAC and '1001' to 'B0' to 'B3' bits of the fragment number field FN of the BA information field BAI, it may represent that the information stored in the BA information field BAI corresponds to the 'Multi-STA' type as the burst information.

In example embodiments, in the third method 705, by writing '1001' to 'B0' to 'B3' bits of the fragment number field FN of the BA information field BAI, it may be represented that the burst information is stored in the BA information field BAI. However, the scope of the present disclosure is not limited thereto.

In example embodiments, it may be represented that the burst information is stored in the BA information field BAI by writing values that are not defined in the IEEE 802.11 standard to 'B0' to 'B3' bits of the fragment number field FN of the BA information field BAI.

As described above with reference to FIG. 11, the wireless reception device RXD may perform the burst type BA by one of a form including a BA start sequence control field in burst type BA data and a form including only a start sequence number field SSN in place of the BA start sequence control field. In example embodiments, when the wireless reception device RXD performs the burst type BA in a form including the BA start sequence control field in the burst type BA data, the first to third methods 701, 703 and 705 may be used. In example embodiments, when the wireless reception device RXD performs the burst type BA in a form including only the start sequence number field SSN, only the first and the second methods 701 and 703 may be used.

Figure 15:
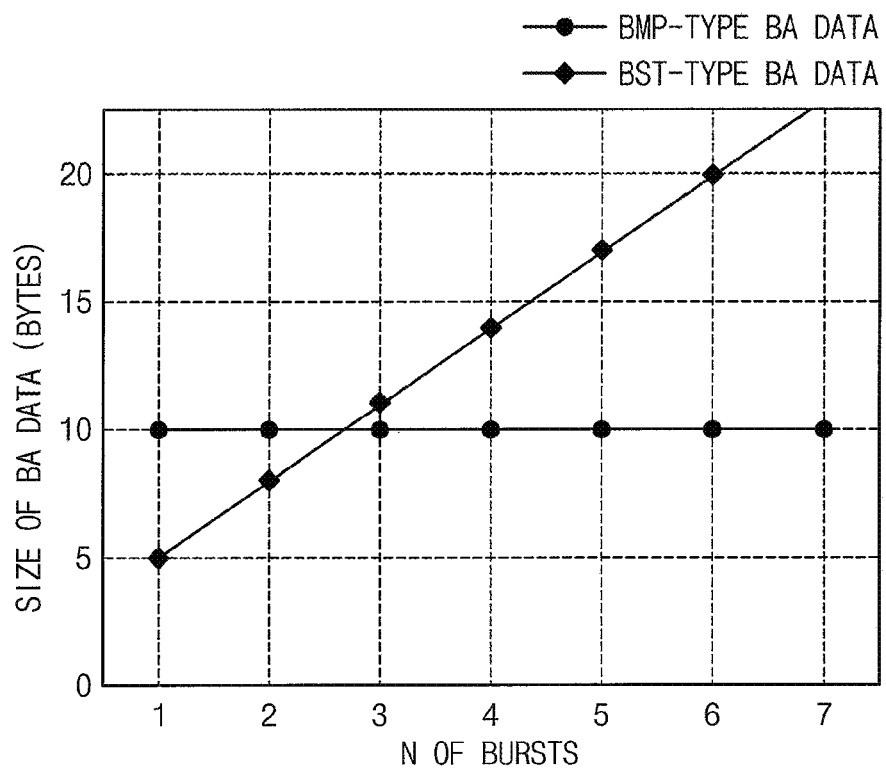
FIGS. 15 and 16 are graphs illustrating an example of a size of burst type BA data and a size of bitmap type BA data according to a change in a number of bursts.
Figure 16:
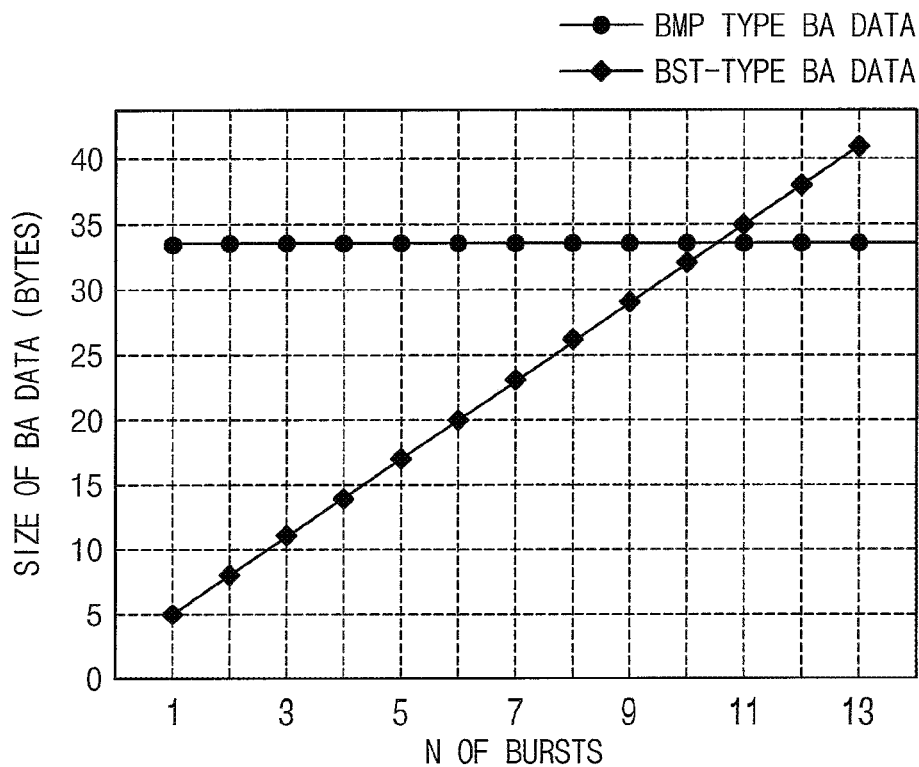

FIGS. 15 and 16 are graphs illustrating an example of a size of burst type BA data and a size of bitmap type BA data according to a change in the number of bursts.

In FIGS. 15 and 16, a X axis represents the number of bursts, and a Y axis represents a size of BA data. It is assumed that, in FIG. 15, a bitmap data field BITMAP DATA included in a bitmap type BA data is represented by 64 bits, e.g., 8 bytes, according to the IEEE 802.11 standard, and in FIG. 16, the bitmap data field BITMAP DATA included in the bitmap type BA data is represented by 256 bits, e.g., 32 bytes, according to the IEEE 802.11 standard.

Referring to FIGS. 12, 13, 15 and 16, the bitmap type BA data BMP-TYPE BA DATA includes a BA start sequence control field and a bitmap data field. The BA start sequence control field is represented by 2 bytes, and the bitmap data field is represented by 64 bits or 256 bits, e.g., 8 bytes or 32 bytes, according to the above assumption. Thus, the bitmap type BA data BMP-TYPE BA DATA has a fixed size of 10 bytes or 34 bytes.

The burst type BA data BST-TYPE BA DATA includes a BA start sequence control field, a first start sequence field SSN1, a first burst data field BURST DATA1, a second start sequence field SSN2, a second burst data field BURST DATA2, a W-th start sequence field SSNW, where W is a natural number greater than or equal to 3, and/or a W-th burst data field BURST DATAW. The BA start sequence control field is represented by 2 bytes, each of the first to the W-th start sequence field is represented by 12 bits, and each of the first to the W-th burst data field BURST DATA1, BURST DATA2 and/or BURST DATAW is represented by 12 bits.

Thus, the burst type BA data BST-TYPE BA DATA has a size of at least 5 bytes, and has a variable size in which a size of at least 3 bytes is additionally increased whenever the number of bursts increases by 1. For example, the burst type BA data BST-TYPE BA DATA may have a size of 5 bytes when the number of bursts is 1, a size of 20 bytes when the number of bursts is 6, and a size of 35 bytes when the number of bursts is 11.

Figure 17:
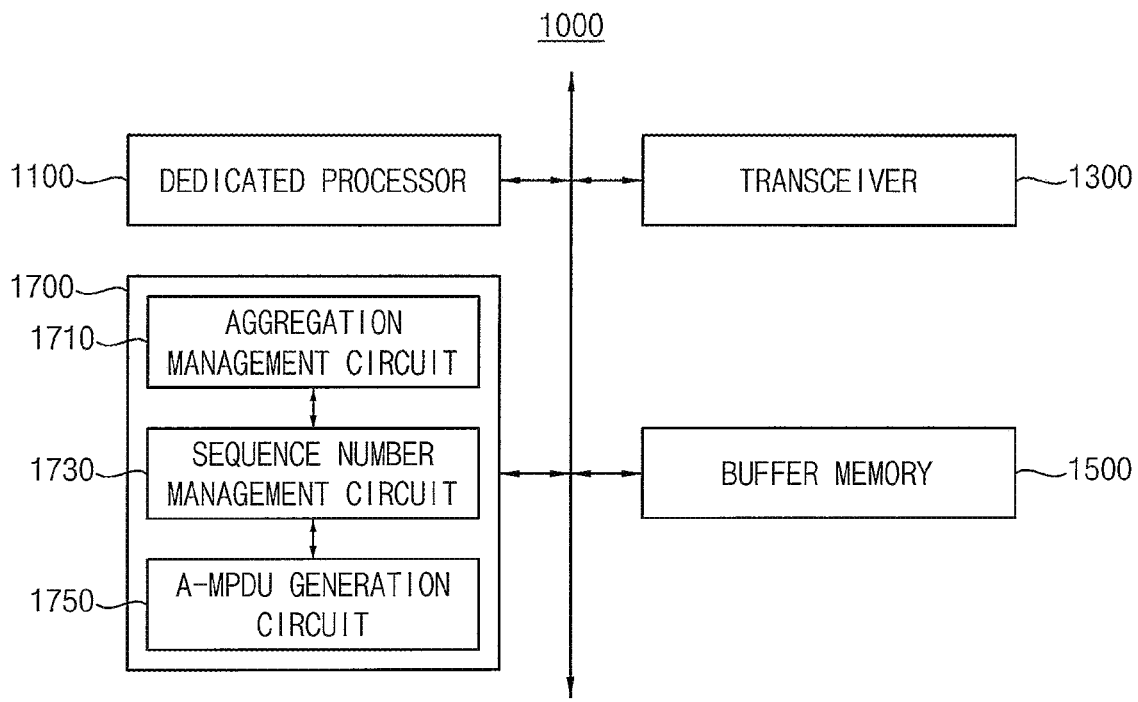
FIG. 17 is a block diagram illustrating a wireless transmission device according to example embodiments.

FIG. 17 is a block diagram illustrating a wireless transmission device according to example embodiments.

Referring to FIG. 17, a wireless transmission device 1000 includes a dedicated processor 1100, a transceiver 1300, a buffer memory 1500 and/or an A-MPDU provider 1700. The A-MPDU provider 1700 includes an aggregation management circuit 1710, a sequence number management circuit 1730 and/or an A-MPDU generation circuit 1750.

The dedicated processor 1100 may control overall operations of the components 1300, 1500, 1700, 1710, 1730 and/or 1750 included in the wireless transmission device 1000, and transmit data generated by the components 1700, 1710, 1730 and/or 1750 to a wireless reception device through the transceiver 1300.

The transceiver 1300 may transmit and receive data by performing the wireless communication described above with reference to FIG. 1 with the wireless reception device.

The buffer memory 1500 includes a transmission buffer and/or a reception buffer, and may temporarily store data transmitted to the wireless reception device or data received from the wireless reception device. In example embodiments, the data may include a request signal, a response signal, an A-MPDU and/or a BA frame.

The A-MPDU provider 1700 may process payload data transmitted to the wireless reception device in the form of the A-MPDU. The A-MPDU was first defined in the IEEE 802.11n standard, and the A-MPDU provider 1700 may aggregate a plurality of MPDUs to generate an A-MPDU. When the MPDUs are aggregated in the A-MPDU, a sequence number corresponding to each of the plurality of MPDUs is assigned to indicate each of the plurality of MPDUs.

The aggregation management circuit 1710 may determine a maximum aggregation number based on an aggregation capability of the wireless transmission device 1000 and/or a size of reception buffer of the wireless reception device.

In example embodiments, the aggregation management circuit 1710 may compare a first number of MPDUs corresponding to the aggregation capability with a second number of MPDUs corresponding to the size of the reception buffer. The aggregation management circuit 1710 may determine the maximum aggregation number as a smaller one of the first number and the second number.

The A-MPDU generation circuit 1750 may generate an A-MPDU including a plurality of MPDUs and transmission sequence numbers of the plurality of MPDUs.

In example embodiments, when the wireless reception device supports burst type BA, the A-MPDU generation circuit 1750 may aggregate the maximum aggregation number of MPDUs in an A-MPDU under a control of the dedicated processor 1100. Even when the wireless reception device does not support the burst type BA, the A-MPDU generation circuit 1750 may aggregate the same number of MPDUs as, or a similar number of MPDUs to, the maximum aggregation number when sequence numbers indicating each of the MPDUs to be transmitted are consecutive. On the other hand, when the wireless reception device does not support the burst type BA and the sequence numbers indicating each of the MPDUs to be transmitted are not consecutive, the A-MPDU generation circuit 1750 may aggregate only a number of MPDUs smaller than the maximum aggregation number.

The sequence number management circuit 1730 may receive the sequence numbers indicating each of the MPDUs to be transmitted, e.g., transmission sequence numbers. In example embodiments, the sequence number management circuit 1730 may transmit information on the transmission sequence numbers to the A-MPDU generation circuit 1750.

The wireless transmission device 1000 may transmit a request signal for requesting information on a size of a reception buffer of the wireless reception device and/or information on whether a burst type BA is supported to the wireless reception device. The wireless transmission device 1000 may determine the maximum aggregation number based on a response signal transmitted by the wireless reception device in response to the request signal.

Figure 18:
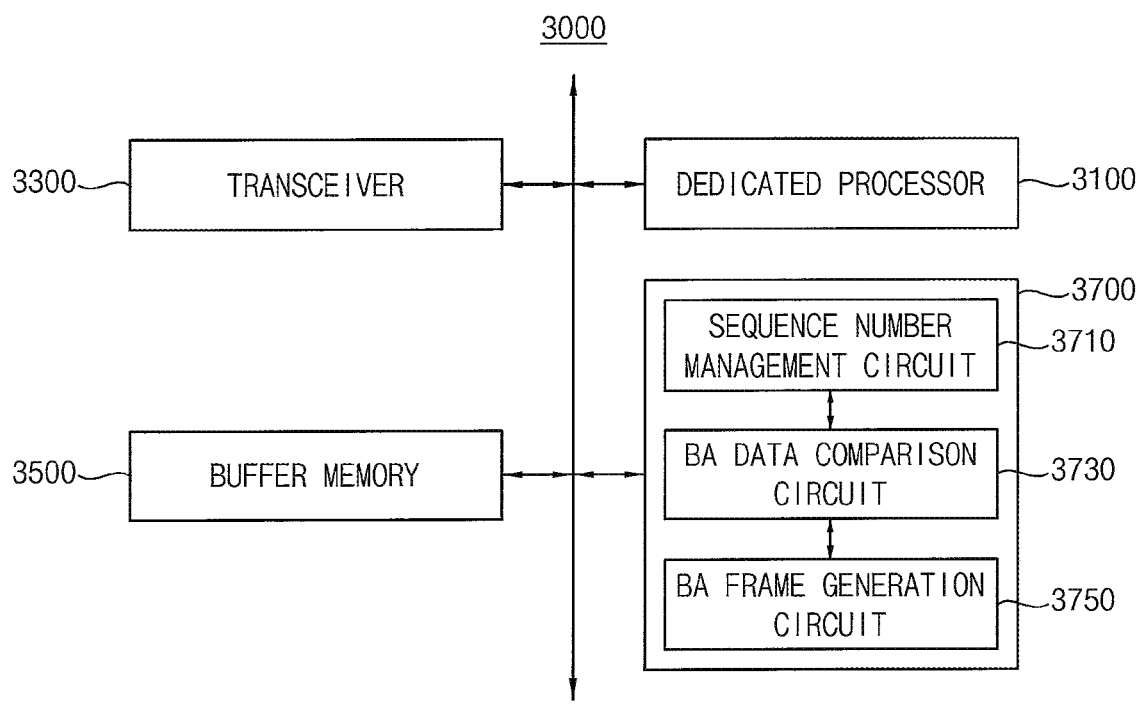
FIG. 18 is a block diagram illustrating a wireless reception device according to example embodiments.

FIG. 18 is a block diagram illustrating a wireless reception device according to example embodiments.

Referring to FIG. 18, a wireless reception device 3000 includes a dedicated processor 3100, a transceiver 3300, a buffer memory 3500 and/or a BA frame provider 3700. The BA frame provider 3700 includes a sequence number management circuit 3710, a BA data comparison circuit 3730 and/or a BA frame generation circuit 3750.

The dedicated processor 3100 may control overall operations of the components 3300, 3500, 3700, 3710, 3730 and/or 3750 included in the wireless reception device 3000, and transmit data generated by the components 3700, 3710, 3730 and/or 3750 to a wireless transmission device through the transceiver 3300.

The transceiver 3300 may transmit and receive data by performing the wireless communication described above with reference to FIG. 1 with the wireless transmission device. In example embodiments, the transceiver 3300 may receive an A-MPDU transmitted the wireless reception device. The A-MPDU may include a plurality of MPDUs and transmission sequence numbers of the plurality of MPDUs.

The buffer memory 3500 includes a transmission buffer and/or a reception buffer, and may temporarily store data transmitted to the wireless transmission device or data received from the wireless transmission device. In example embodiments, the data may include a request signal, a response signal, an A-MPDU and/or a BA frame.

The BA frame provider 3700 may generate the BA frame informing the wireless transmission device of success sequence numbers corresponding to successfully received MPDUs among the MPDUs that are aggregated in the A-MPDU and transmitted. In example embodiments, the BA frame may include a plurality of fields represented by a fixed size indicated by a total of 22 bytes and a variable size. For example, each of the plurality of fields may be represented by a fixed size of 2, 2, 6, 6, 2 and 4 bytes and the variable size.

The sequence number management circuit 3710 may generate burst information based on the consecutiveness of success sequence numbers corresponding to successfully received MPDUs of the plurality of MPDUs. In example embodiments, the sequence number management circuit 3710 may extract the success sequence numbers from a sequence control field of a MAC header of the A-MPDU.

The BA data comparison circuit 3730 may receive the burst information from the sequence number management circuit 3710. The BA data comparison circuit 3730 may generate burst type BA data based on the burst information.

In example embodiments, the BA data comparison circuit 3730 may determine to generate one of a burst type BA frame and a bitmap type BA frame based on the number of bursts included in the burst information. In this case, a size of the burst type BA data and a size of the bitmap type BA data according to a change in the number of bursts described above with reference to FIGS. 15 and 16 may be compared with each other.

The BA frame generation circuit 3750 may generate one of a bitmap type BA frame and a burst type BA frame based on the result of the comparison.

In example embodiments, when the wireless reception device 3000 performs the BA for sequence numbers corresponding from a minimum or smallest number among the success sequence numbers to a number increased by 64, the wireless reception device 3000 may generate the burst type BA frame when the number of bursts is less than or equal to '3', and the wireless reception device 300 may generate the bitmap type BA frame when the number of bursts is greater than '3'.

In example embodiments, when the wireless reception device 3000 performs the BA for sequence numbers corresponding from a minimum or smallest number among the success sequence numbers to a number increased by 256, the wireless reception device 3000 may generate the burst type BA frame when the number of bursts is less than or equal to '34', and the wireless reception device 300 may generate the bitmap type BA frame when the number of bursts is greater than '34'.

Figure 19:
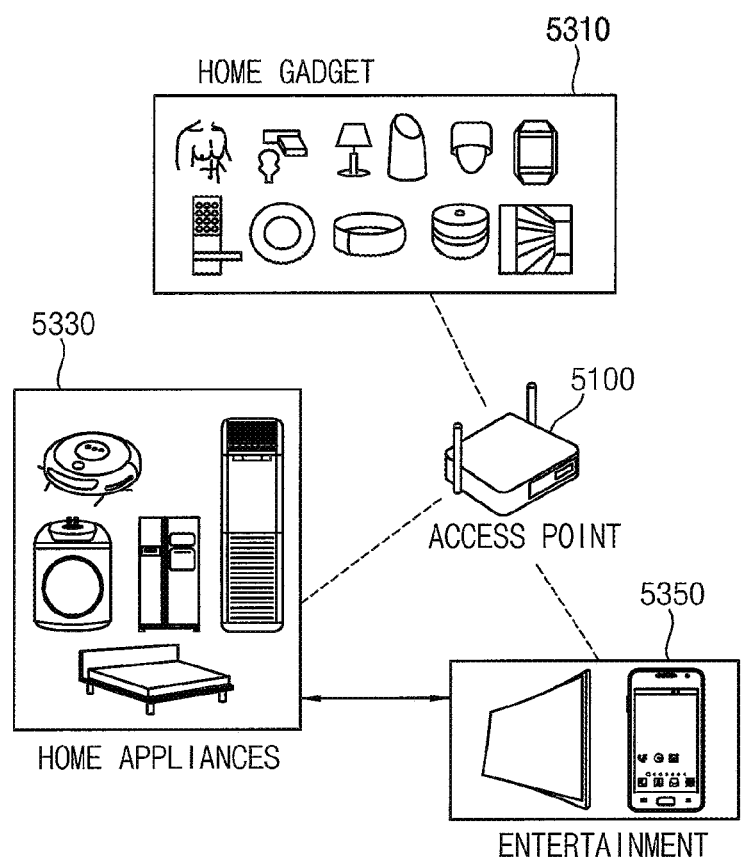
FIG. 19 is a diagram illustrating a wireless communication system according to example embodiments.

FIG. 19 is a diagram illustrating of a wireless communication system according to example embodiments.

Referring to FIG. 19, in wireless communication system 5000, various wireless communication devices 5100, 5310, 5330 and/or 5350 may perform wireless communication with each other.

Home gadgets 5310, home appliances 5330, entertainment devices 5350, and/or an access point (AP) 5100 may configure an Internet of Thing (IoT) network system 5000. Each of the home gadgets 5310, the home appliances 5330, the entertainment devices 5350, and/or the AP 5100 may include a transceiver as a component according to example embodiments. The home gadgets 5310, the home appliances 5330, and the entertainment devices 5350 may wirelessly communicate with the AP 5100, and/or may wirelessly communicate with one another. According to example embodiments, each of the home gadgets 5310, the home appliances 5330, the entertainment devices 5350 and/or the AP 5100 may include the wireless transmission device 1000 and/or the wireless reception device 300, and may perform the operations discussed in association with FIGS. 1-16.

Each of the components illustrated in FIGS. 17 to 19 may be implemented as hardware components, but may also be implemented as software components in combination with hardware.

According to example embodiments, operations described herein as being performed by the wireless transmission device TXD, the wireless reception device RXD, the wireless transmission device 1000, the dedicated processor 1100, the transceiver 1300, the A-MPDU provider 1700, the aggregation management circuit 1710, the sequence number management circuit 1730, the A-MPDU generation circuit 1750, the wireless reception device 3000, the dedicated processor 3100, the transceiver 3300, the BA frame provider 3700, the sequence number management circuit 3710, the BA data comparison circuit 3730, the BA frame generation circuit 3750, the wireless communication system 5000, the home gadgets 5310, the home appliances 5330, the entertainment devices 5350 and/or the AP 5100 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Conventional wireless communication devices generate A-MPDUs without aggregating the maximum or highest aggregation number of MPDUs. Accordingly, the conventional wireless communication devices provide insufficient transmission throughput. Also, the conventional wireless communication devices perform block acknowledgement (BA) using a BA frame that does not support BA of the maximum or highest aggregation number of MPDUs. Accordingly, the conventional wireless communication devices use excessive BA overhead (e.g., excessive processing, signal transmission and/or reception, memory usage, power consumption, etc.).

However, according to example embodiments, improved wireless communication devices are provided. In particular, a wireless transmission device is provided that generates A-MPDUs by aggregating the maximum or highest aggregation number of MPDUs, and thereby improves transmission throughput. Also, a wireless reception device is provided that performs BA using a burst type BA frame supporting BA of the maximum or highest aggregation number of MPDUs, and thereby reduces BA overhead (e.g., excessive processing, signal transmission and/or reception, memory usage, power consumption, etc.). For example, the burst type BA frame may be a data structure supported by the wireless transmission device and the wireless reception device that enables the BA of the maximum or highest aggregation number of MPDUs.

As described above, in the method of performing wireless communication, the wireless transmission device and the wireless reception device according to example embodiments, when the wireless reception device supports the burst type BA, the wireless transmission device may improve a transmission throughput by aggregating a maximum aggregation number of MPDUs in an A-MPDU and transmitting the A-MPDU to the wireless reception device. In addition, the wireless reception device may reduce overhead that may occur when performing the BA by performing the burst type BA or adaptively performing one of the burst type BA and the bitmap type BA.

The present disclosure may be usefully used in any electronic device including a wireless communication device. For example, the present disclosure may be applied to a mobile phone, a smart phone, a personal digital assistant (PDA), a portable multimedia player (PMP), a digital camera, a personal computer (PC), a server computer, a workstation, a laptop, a digital television, a set-top box, a music player, a portable game console, a navigation system, and/or the like.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order. As used herein the term "and/or" includes any and all combinations of one or more of the associated listed items.

The foregoing is illustrative of example embodiments and is not to be construed as limiting thereof. Although example embodiments have been described, those skilled in the art will readily appreciate that many modifications are possible without materially departing from the novel teachings and advantages of example embodiments. Accordingly, all such modifications are intended to be included within the scope of example embodiments as defined in the claims. Therefore, it is to be understood that the foregoing is illustrative of example embodiments and is not to be construed as limited to example embodiments disclosed, and that modifications to example embodiments are intended to be included within the scope of the appended claims.

What is claimed is:

1. A method of performing wireless communication, the method comprising:
   generating, by a wireless transmission device, an Aggregate-Medium Access Control (MAC) Protocol Data Unit (A-MPDU) including a plurality of MPDUs and a plurality of sequence numbers corresponding to the plurality of MPDUs;
   transmitting, by the wireless transmission device, the A-MPDU to a wireless reception device;
   generating, by the wireless reception device, burst information based on one or more success sequence numbers among the plurality of sequence numbers, the one or more success sequence numbers corresponding to one or more MPDUs successfully received by the wireless reception device among the plurality of MPDUs, and the generating the burst information including grouping consecutive sequence numbers among the one or more success sequence numbers; and
   transmitting, by the wireless reception device, a block acknowledgement (BA) frame based on the burst information to the wireless transmission device.

2. The method of claim 1, wherein the generating the A-MPDU comprises:
   determining a maximum aggregation number based on an aggregation capability of the wireless transmission device and a size of a reception buffer of the wireless reception device; and
   generating the A-MPDU by aggregating the plurality of MPDUs including the maximum aggregation number of MPDUs.

3. The method of claim 2, wherein the determining the maximum aggregation number comprises:
   determining the maximum aggregation number as a smaller of a first number of MPDUs and a second number of MPDUs, the first number of MPDUs corresponding to the aggregation capability, and the second number of MPDUs corresponding to the size of the reception buffer.

4. The method of claim 1, wherein the generating the burst information comprises:
   generating one or more bursts by grouping the consecutive sequence numbers among the one or more success sequence numbers; and
   determining the burst information including,
      determining a quantity of the one or more bursts,
      determining a smallest sequence number among the consecutive sequence numbers included in each of the one or more bursts, and
      determining one of
         a quantity of the consecutive sequence numbers included in each of the one or more bursts, or
         a largest sequence number among consecutive sequence numbers included in each of the one or more bursts.

5. The method of claim 4, further comprising:
   predicting, by the wireless reception device, a size of burst type BA data including the burst information and a size of bitmap type BA data based on the quantity of the one or more bursts; and
   generating, by the wireless reception device, the BA frame based on the size of the burst type BA data and the size of the bitmap type BA data.

6. The method of claim 5, wherein the generating the BA frame comprises:
   generating a burst type BA frame including the burst type BA data as the BA frame in response to predicting the size of the burst type BA data is smaller than the size of the bitmap type BA data; and generating a bitmap type BA frame including the bitmap type BA data as the BA frame in response to predicting the size of the burst type BA data is larger than the size of the bitmap type BA data.

7. The method of claim 6, wherein
the burst type BA frame includes a BA control field and a BA information field; and
the BA information field includes:
  a BA start sequence control field including a burst number field storing the quantity of the one or more bursts,
  one or more start sequence fields storing the smallest sequence number corresponding to each of the one or more bursts, and
  one or more burst data fields storing one of
    the quantity of the consecutive sequence numbers included in each of the one or more bursts, or
    the largest sequence number included in each of the one or more bursts.

8. The method of claim 7, wherein
the BA control field is represented by 2 bytes;
the BA information field is represented by at least 5 bytes; and
each of the burst number field, the one or more start sequence fields and the one or more burst data fields is represented by 12 bits.

9. The method of claim 7, wherein a portion of bits of the BA control field represents that the burst information is stored in the BA information field.

10. The method of claim 7, wherein
the BA start sequence control field includes a fragment number field; and
a portion of bits of each of the BA control field and the fragment number field represents that the burst information is stored in the BA information field.

11. The method of claim 1, further comprising:
transmitting, by the wireless transmission device, a request signal to the wireless reception device; and
transmitting, by the wireless reception device, a response signal in response to the request signal to the wireless transmission device, the response signal indicating a size of a reception buffer of the wireless reception device and whether the wireless reception device supports burst type BA.

12. The method of claim 11, wherein the response signal includes a plurality of fields, and one of the plurality of fields of the response signal represents whether the wireless reception device supports the burst type BA.

13. The method of claim 11, wherein the generating the A-MPDU comprises:
determining whether the wireless reception device supports the burst type BA; or
determining whether the plurality of sequence numbers are consecutive.

14. The method of claim 13, wherein generating the A-MPDU comprises:
generating the A-MPDU by aggregating the plurality of MPDUs including a maximum aggregation number of MPDUs in response to determining the wireless reception device supports the burst type BA or the plurality of sequence numbers are consecutive; and
generating the A-MPDU by aggregating the plurality of MPDUs including a number of MPDUs less than the maximum aggregation number in response to determining the wireless reception device does not support the burst type BA and the plurality of sequence numbers are not consecutive.

15. A wireless transmission device comprising:
processing circuitry configured to,
  determine a maximum aggregation number based on an aggregation capability of the wireless transmission device and a size of a reception buffer of a wireless reception device, and
  generate an Aggregate-Medium Access Control (MAC) Protocol Data Unit (A-MPDU) including a plurality of MPDUs and a plurality of sequence numbers corresponding to the plurality of MPDUs by aggregating the plurality of MPDUs including the maximum aggregation number of MPDUs; and
a transceiver configured to transmit the A-MPDU to the wireless reception device.

16. The wireless transmission device of claim 15, wherein the processing circuitry is configured to determine the maximum aggregation number as a smaller of a first number of MPDUs and a second number of MPDUs, the first number of MPDUs corresponding to the aggregation capability, and the second number of MPDUs corresponding to the size of the reception buffer.

17. The wireless transmission device of claim 15, wherein
the transceiver is configured to transmit a request signal to the wireless reception device; and
the processing circuitry is configured to determine the maximum aggregation number based on a response signal received from the wireless reception device in response to the request signal, the response signal indicating a size of a reception buffer of the wireless reception device and whether the wireless reception device supports burst type BA.

18. A wireless reception device comprising:
a transceiver configured to receive an Aggregate-Medium Access Control (MAC) Protocol Data Unit (A-MPDU) including a plurality of MPDUs and a plurality of sequence numbers corresponding to the plurality of MPDUs; and
processing circuitry configured to,
  generate burst information based on one or more success sequence numbers among the plurality of sequence numbers, the one or more success sequence numbers corresponding to one or more MPDUs successfully received by the transceiver among the plurality of MPDUs, and the generation of the burst information including grouping consecutive sequence numbers among the one or more success sequence numbers,
  generate burst type BA data based on the burst information, and
  generate a burst type BA frame including the burst type BA data.

19. The wireless reception device of claim 18, wherein the processing circuitry is configured to:
generate one or more bursts based on the grouped consecutive sequence numbers; and
determine a quantity of the one or more bursts.

20. The wireless reception device of claim 19, wherein the processing circuitry is configured to:
predict a size of the burst type BA data including the burst information and a size of bitmap type BA data based on the quantity of the one or more bursts; and generate the burst type BA frame including the burst type BA data in response to predicting the size of the burst type BA data is smaller than the size of the bitmap type BA data.

\* \* \* \* \*